United States Patent
Onishi

(10) Patent No.: US 6,588,711 B2
(45) Date of Patent: Jul. 8, 2003

(54) FASTENING FIXTURE

(76) Inventor: Masakatsu Onishi, 8-5, Shirasagi-cho 3-chome, Sakai-shi, Osaka (JP)

( * ) Notice: Subject to any disclaimer, the term of this patent is extended or adjusted under 35 U.S.C. 154(b) by 0 days.

(21) Appl. No.: 09/736,915

(22) Filed: Dec. 14, 2000

(65) Prior Publication Data

US 2001/0004099 A1 Jun. 21, 2001

(30) Foreign Application Priority Data

Dec. 21, 1999 (JP) .......................... 11-363358
Jan. 24, 2000 (JP) .......................... 2000-015070

(51) Int. Cl.$^7$ .............................................. E01F 13/00
(52) U.S. Cl. ................. 248/49; 248/68.1; 248/221.11; 248/73; 411/84; 411/508
(58) Field of Search ................. 248/500, 221.11, 248/58, 73, 68.1, 74.1, 49, 74.3, 223.41, 228.2, 72, 222.14, 222.11, 222.12; 411/84, 85, 508, 509, 182

(56) References Cited

U.S. PATENT DOCUMENTS

| | | | | |
|---|---|---|---|---|
| 3,175,263 A | * | 3/1965 | Bernstein ........................ 24/81 |
| 3,295,805 A | * | 1/1967 | Girard .......................... 248/68 |
| 3,494,646 A | * | 2/1970 | Cumber ................. 287/189.36 |
| 4,285,379 A | * | 8/1981 | Kowalski ...................... 411/85 |
| 4,770,378 A | * | 9/1988 | Onishi et al. ............... 248/68.1 |
| 4,830,531 A | * | 5/1989 | Condit et al. ................ 403/348 |
| 4,917,553 A | * | 4/1990 | Muller ......................... 411/85 |
| 5,271,586 A | * | 12/1993 | Schmidt ....................... 248/58 |
| 5,769,365 A | * | 6/1998 | Onishi et al. .................. 248/49 |
| 5,833,417 A | * | 11/1998 | Sargent et al. ................ 411/85 |
| 5,893,538 A | * | 4/1999 | Onishi et al. .................. 248/65 |
| 5,967,467 A | * | 10/1999 | Onishi et al. .................. 248/49 |

* cited by examiner

Primary Examiner—Kimberly Wood
(74) Attorney, Agent, or Firm—Michael J. Striker

(57) ABSTRACT

A fastening fixture of a simple and compact structure comprising: a fixture body; a screw having a stem portion inserted into the fixture body; and a fastening nut screwed on the stem portion of the screw. In order that a temporarily fixed state may be established by inserting the fastening nut into an entrance channel or hole into the fastening nut with the fixture body being griped and by turning the fixture body by 90 degrees, the fixture body is provided with a depending member in parallel with the stem portion of the screw, and the fastening nut is provided at its longer side edge portion with a guide portion which is regulated in its turn but allowed to move only in parallel with the stem portion of the screw by fitting on or confronting the depending member. Therefore, the fastening fixture can effect the temporary fixing and the fastening fixing simply independently of the depth or inner width of the channel or hole.

5 Claims, 26 Drawing Sheets

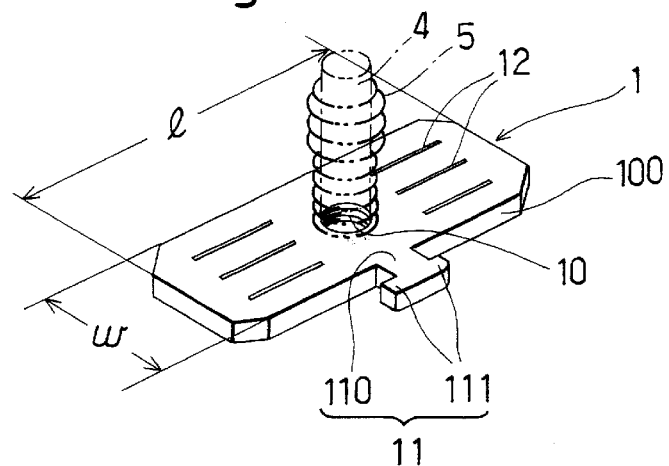
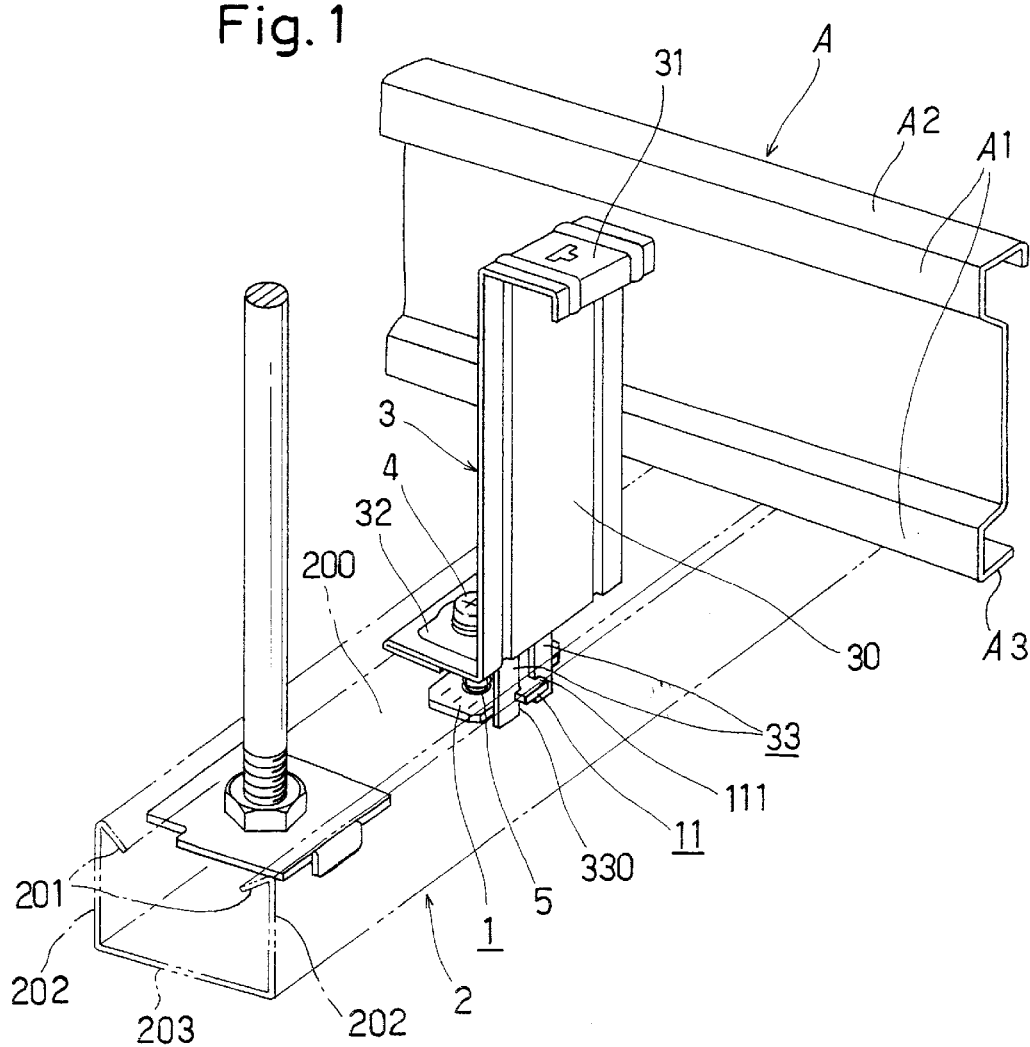

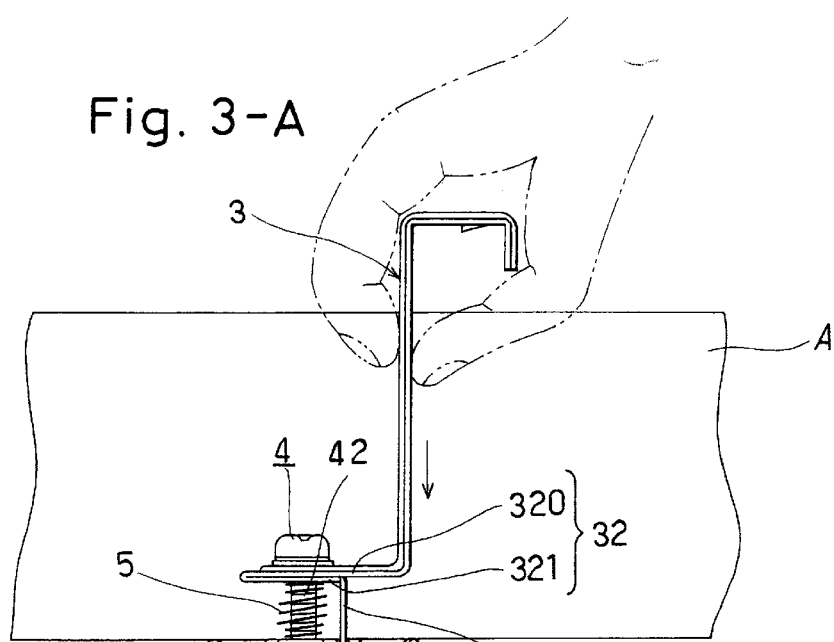
Fig. 3-A
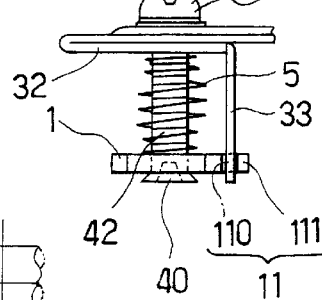
Fig. 3-B
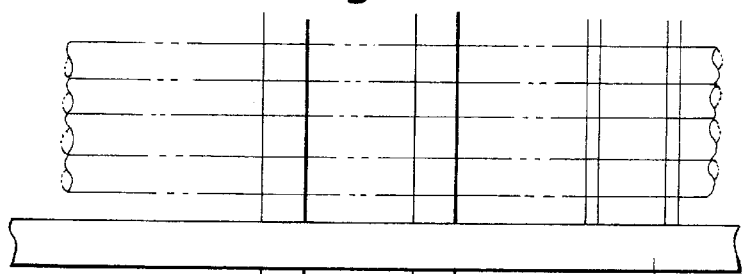
Fig. 3-C
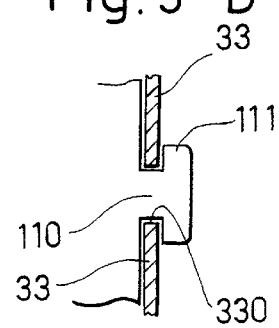
Fig. 3-D

Fig.4-A
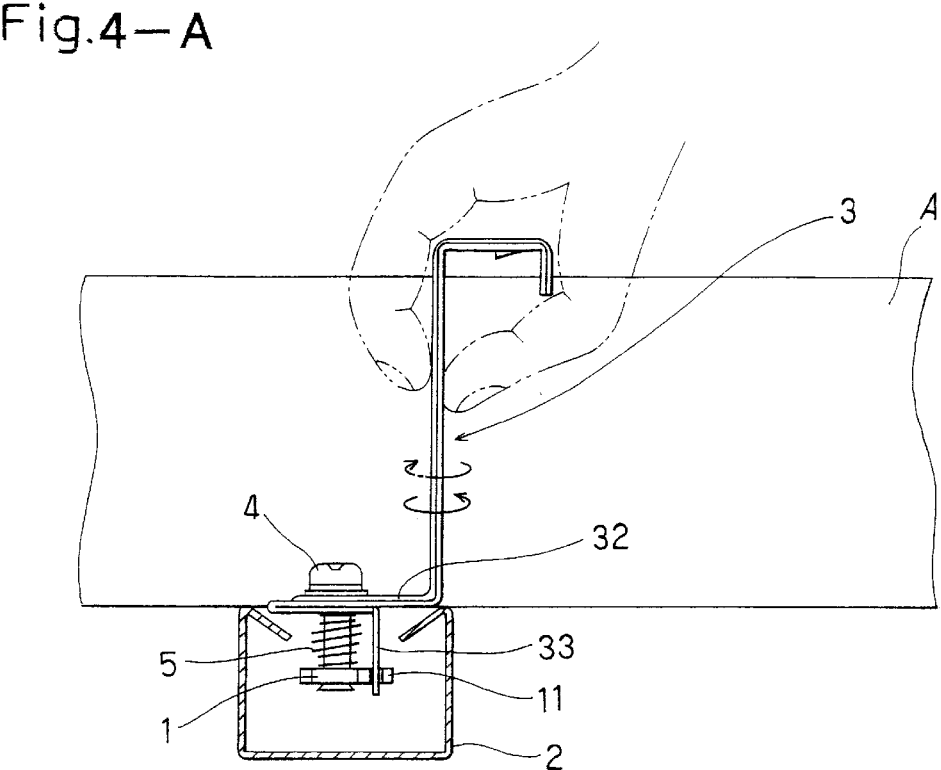
Fig.4-B
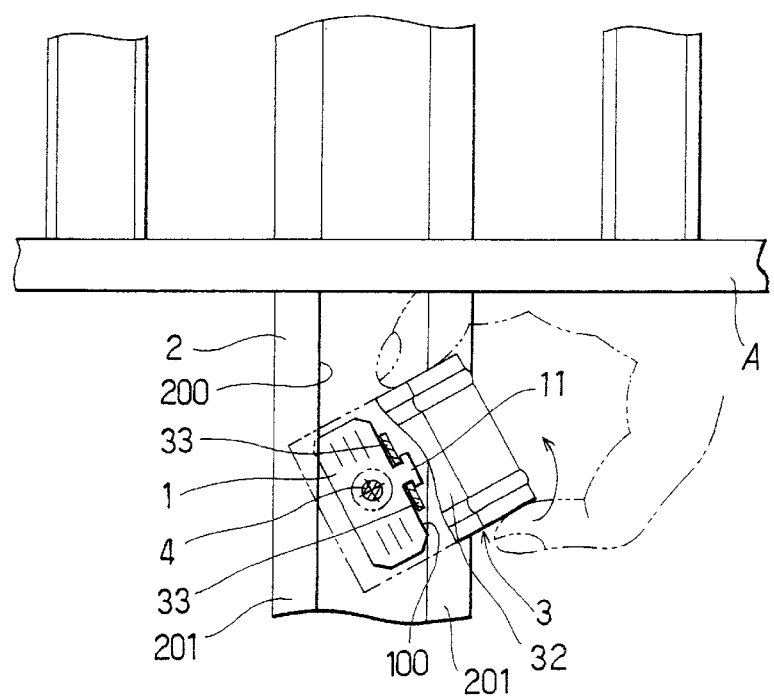

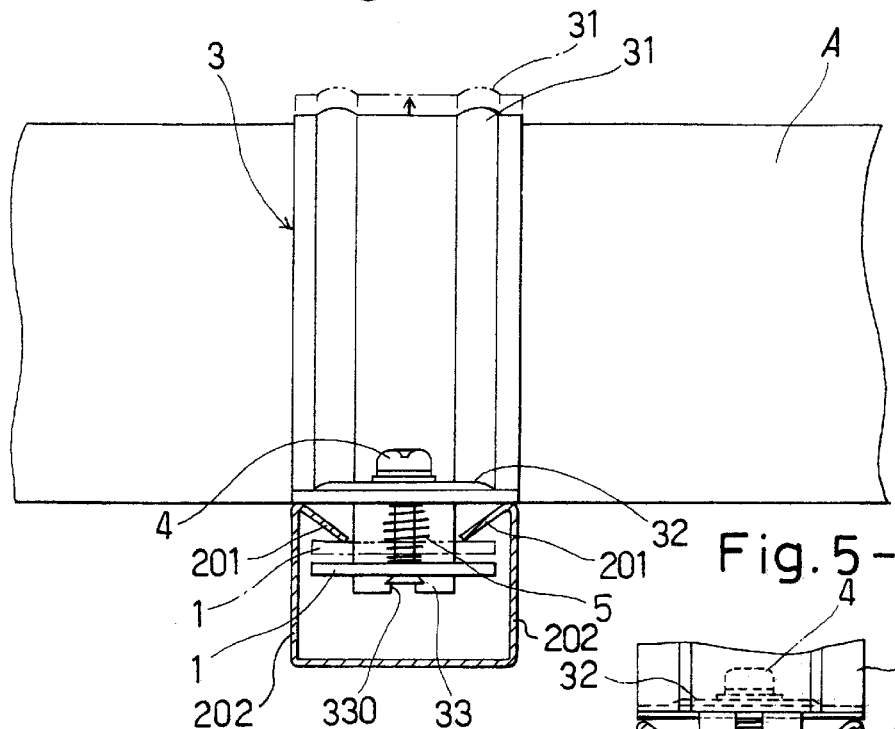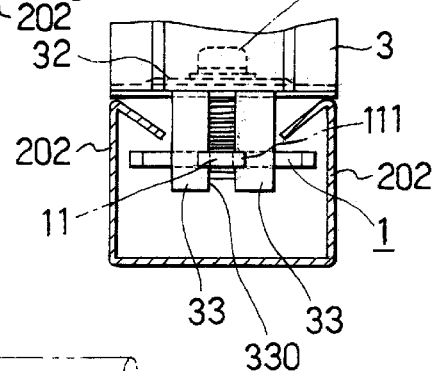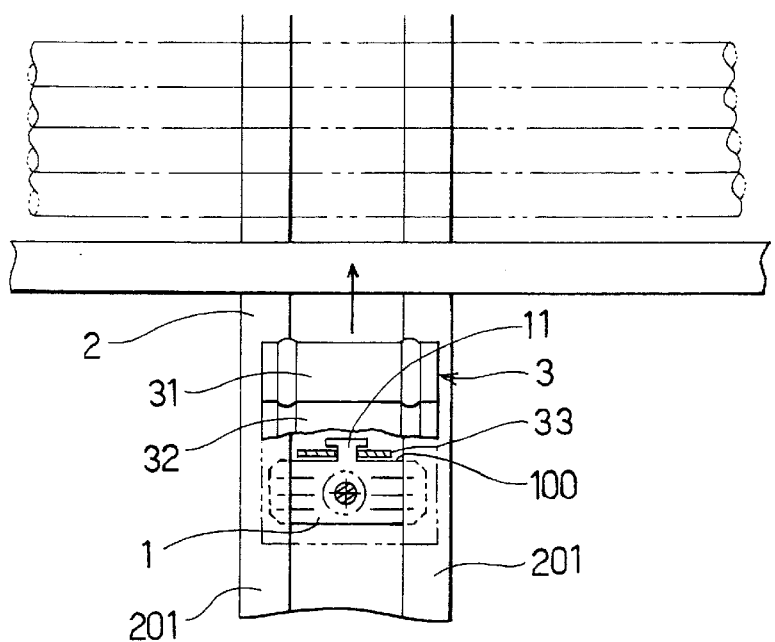

Fig. 6-A
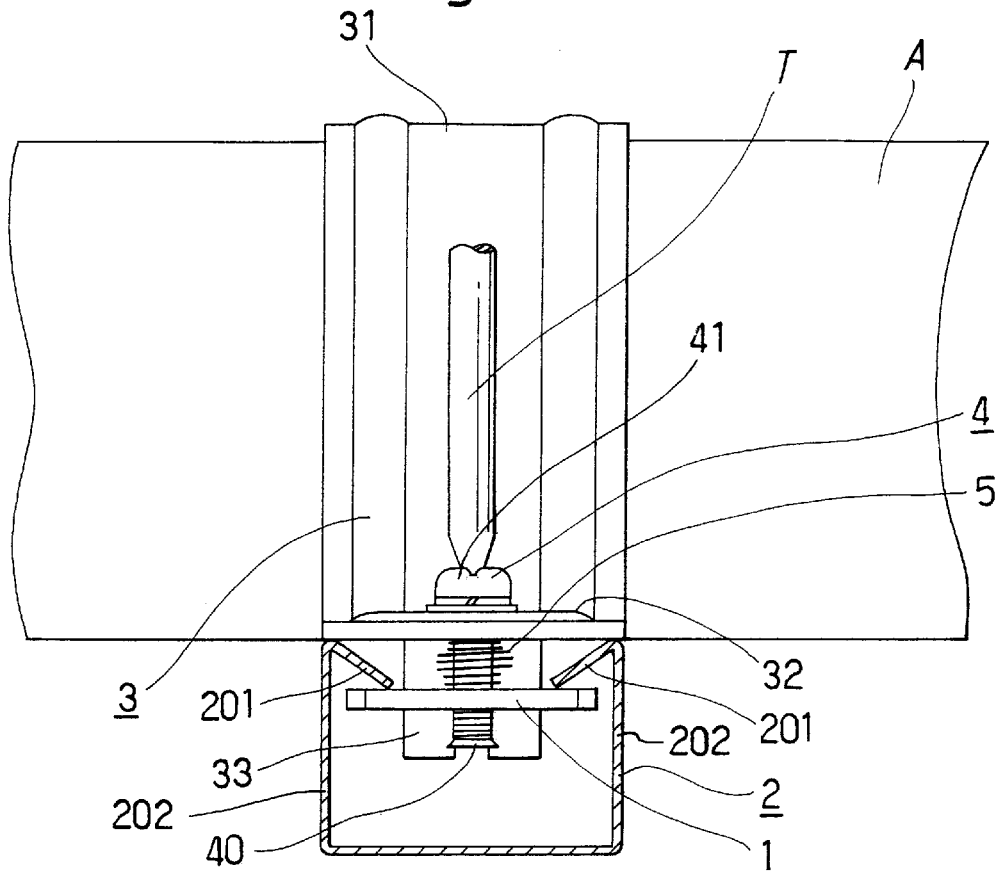
Fig. 6-B
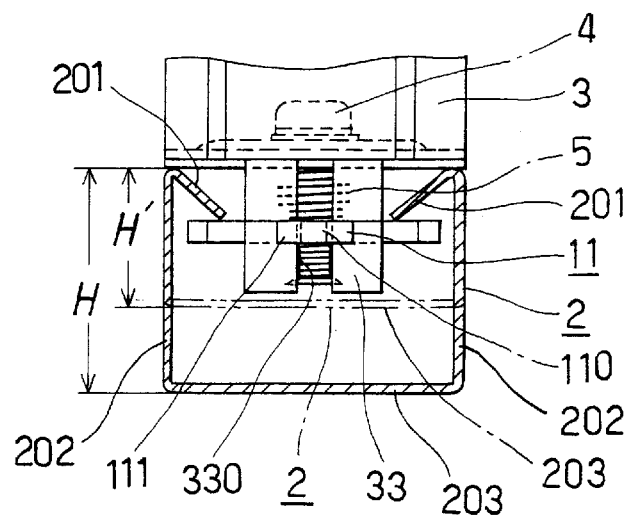

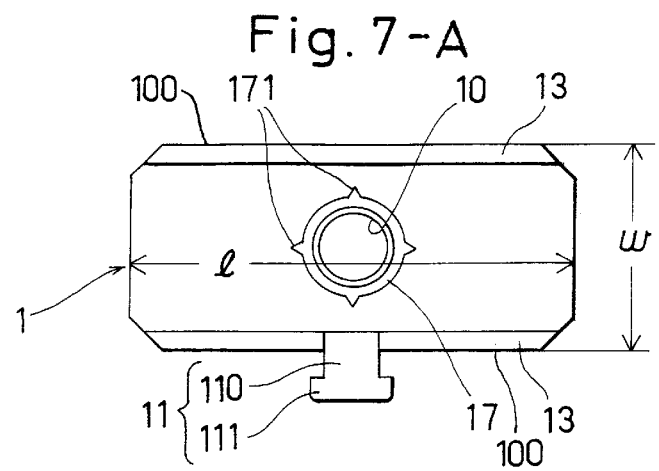
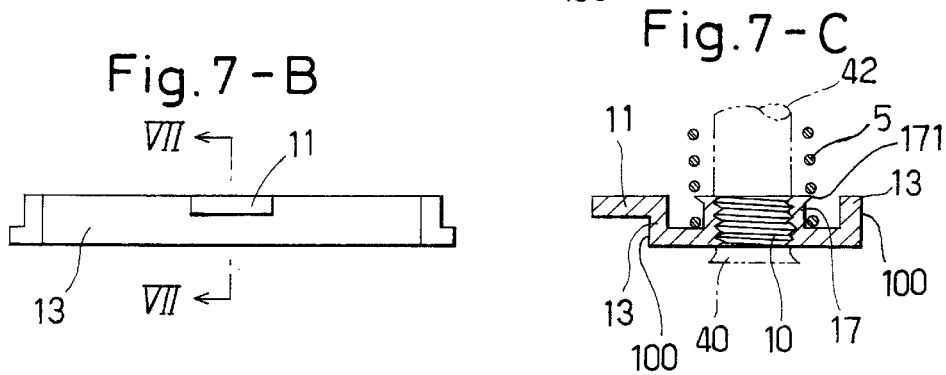
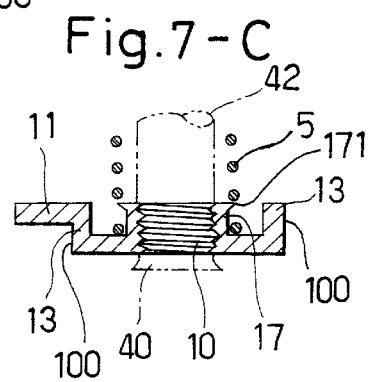
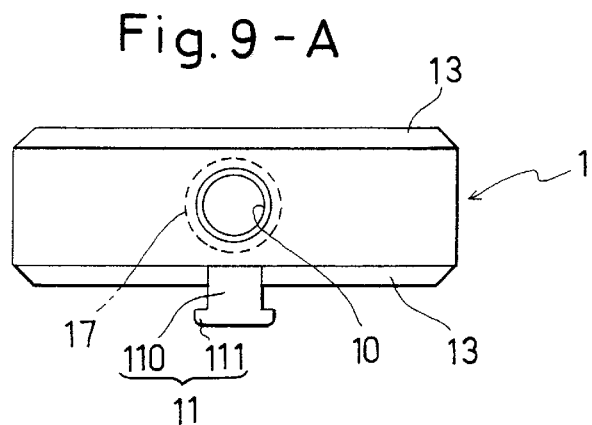
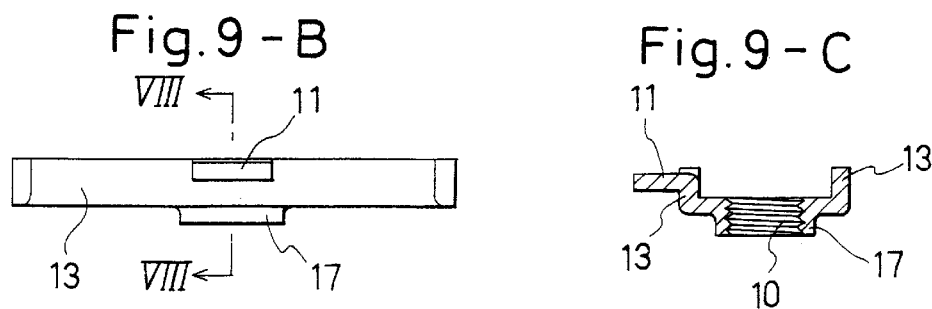
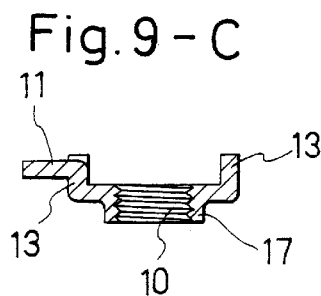

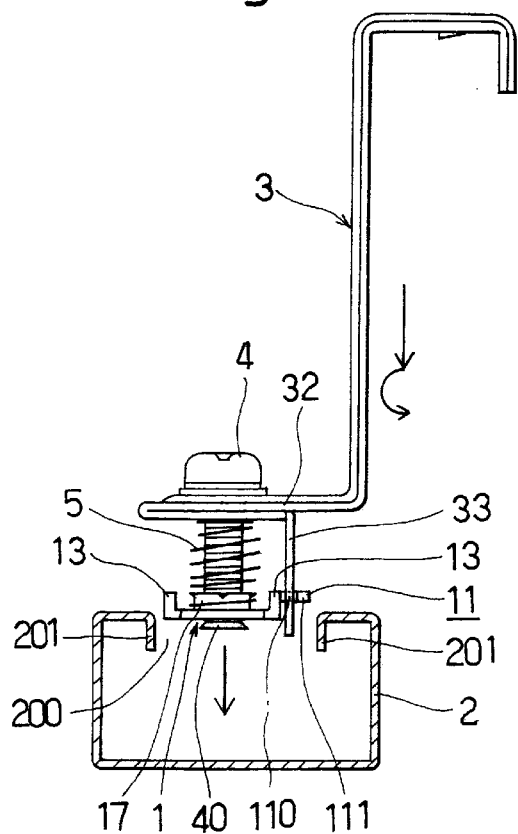
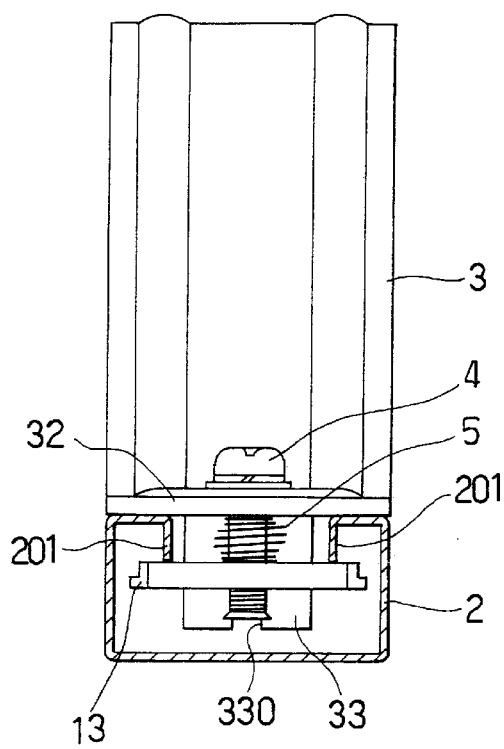
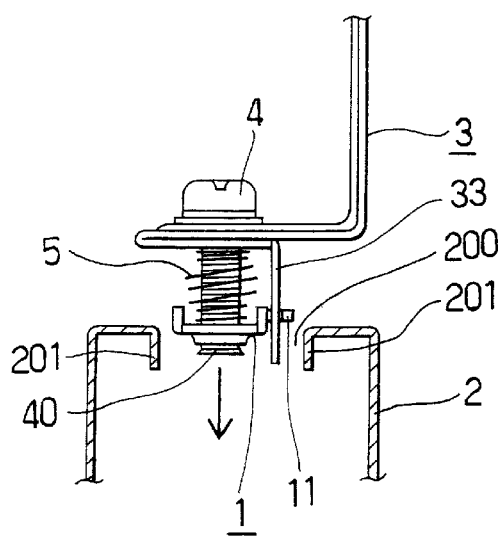
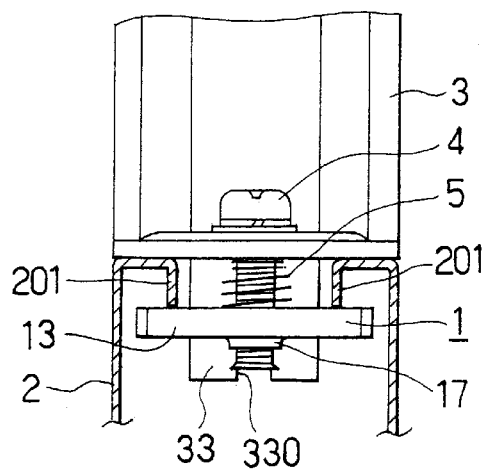

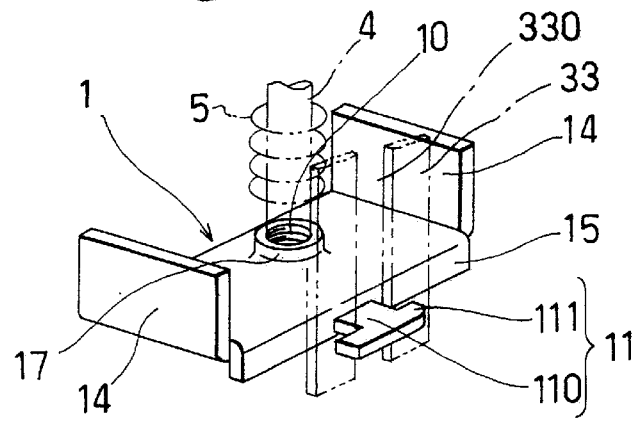
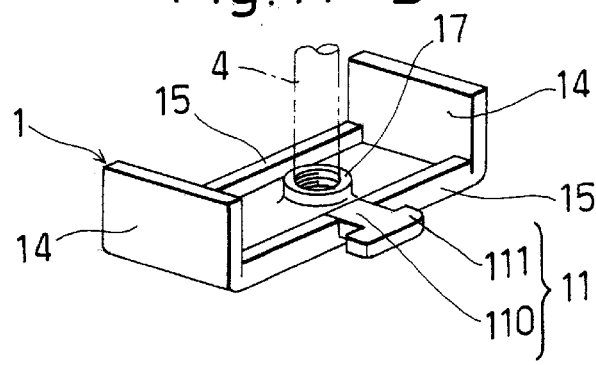
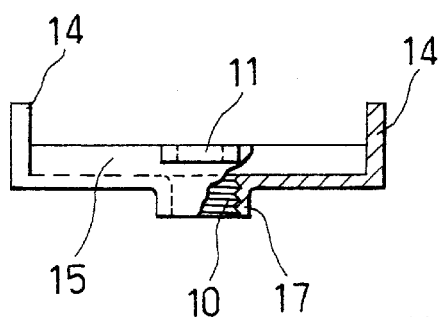
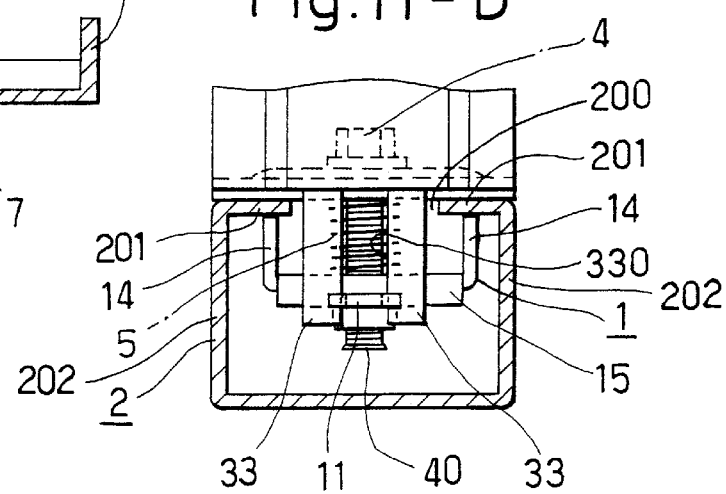

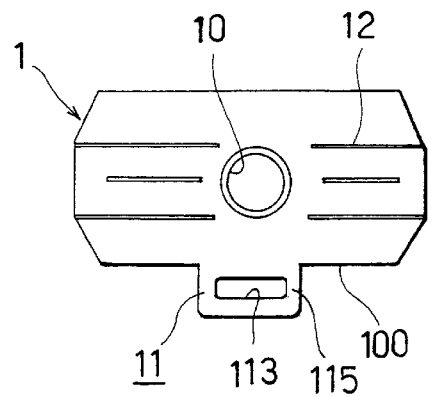
Fig.12-A
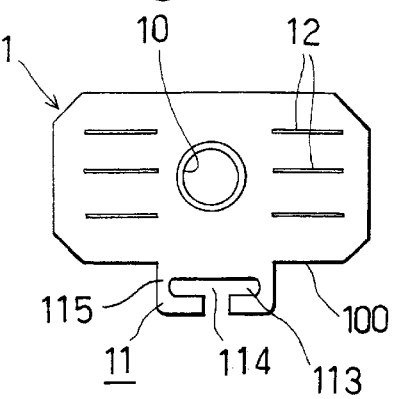
Fig.12-B
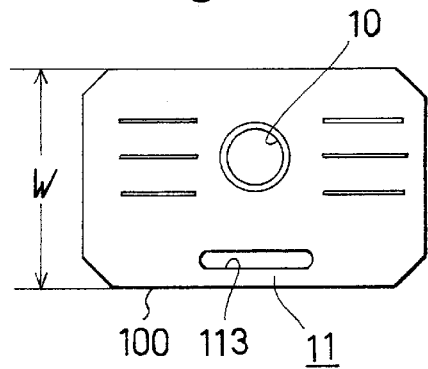
Fig.13-A
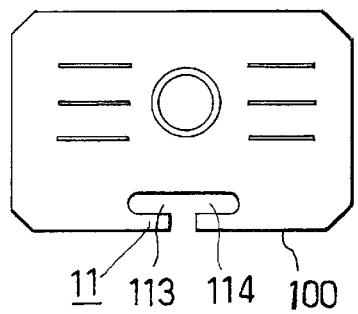
Fig.13-B
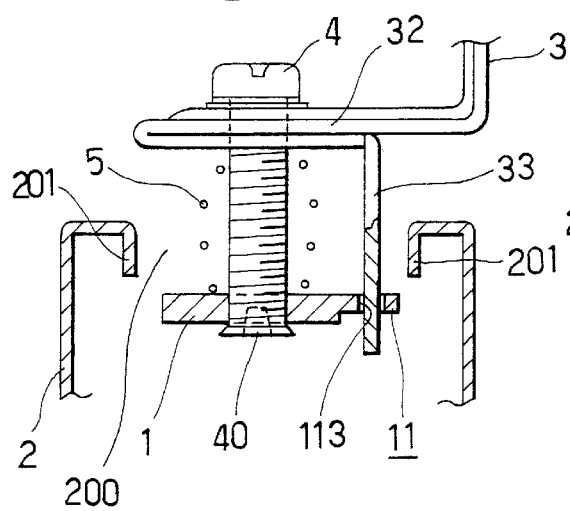
Fig.14-A
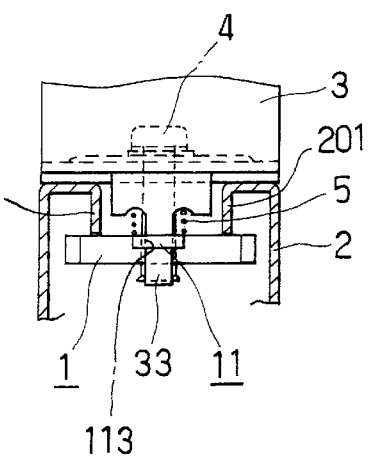
Fig.14-B Fig. 15-A
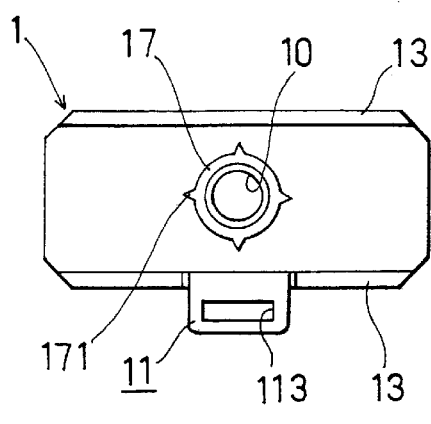
Fig. 15-B
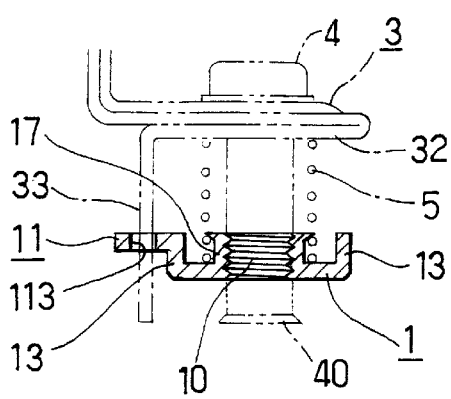
Fig. 15-C
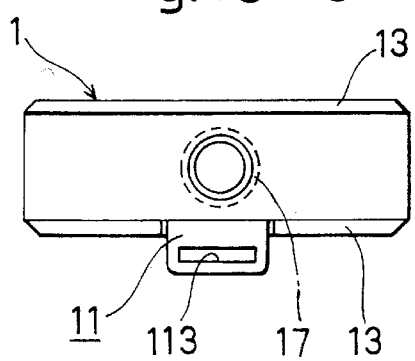
Fig. 15-D
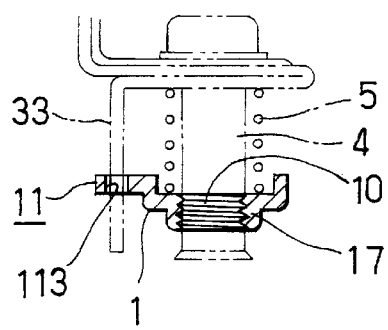
Fig. 15-E
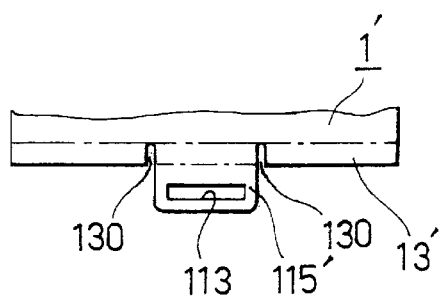

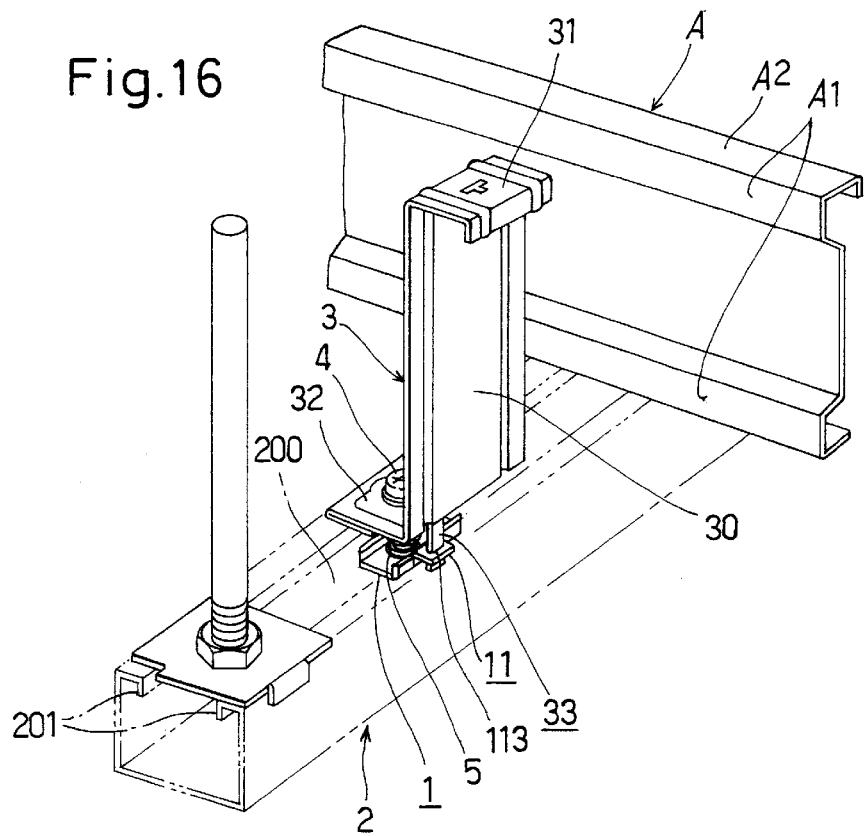
Fig.16
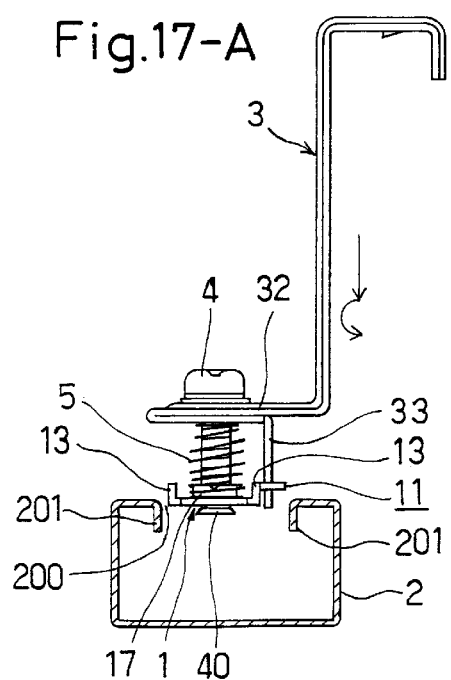
Fig.17-A
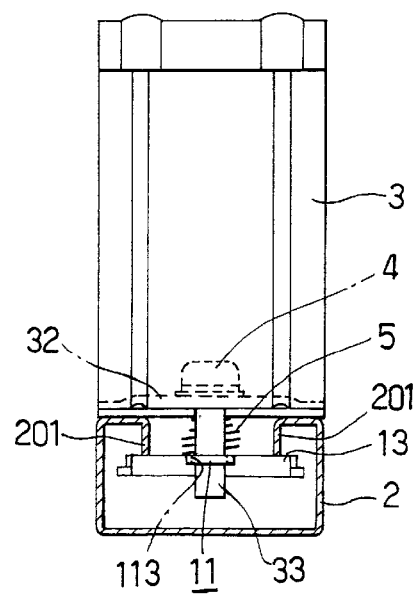
Fig.17-B

Fig.18-A
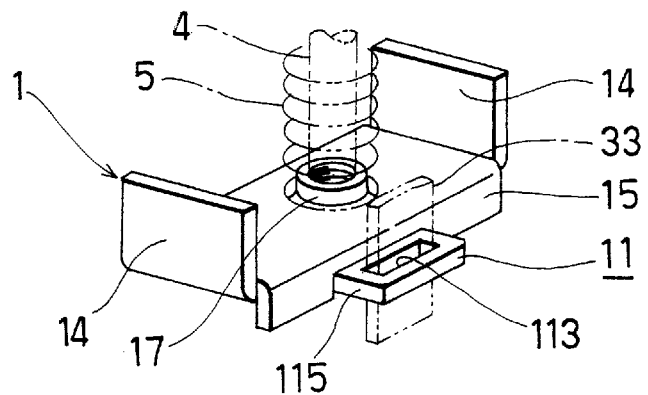
Fig.18-B
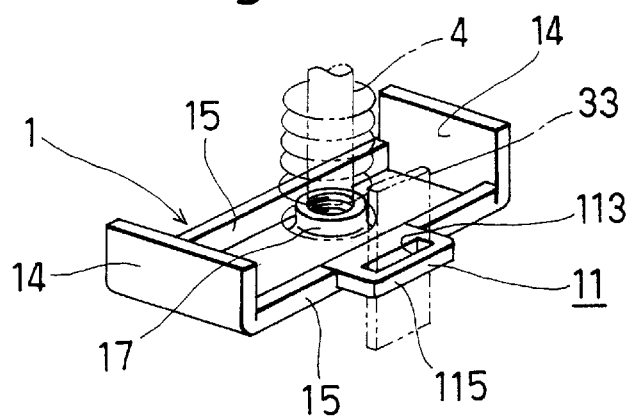
Fig.18-C
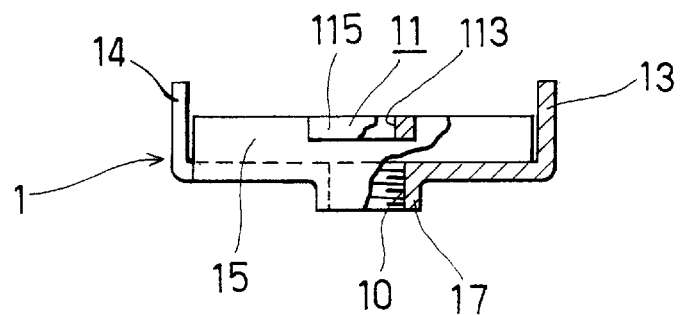

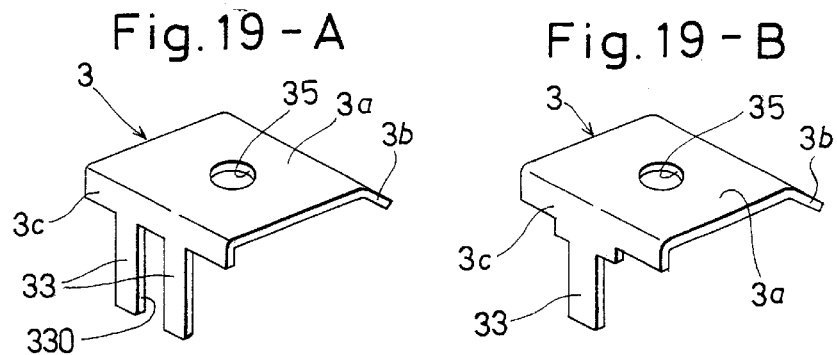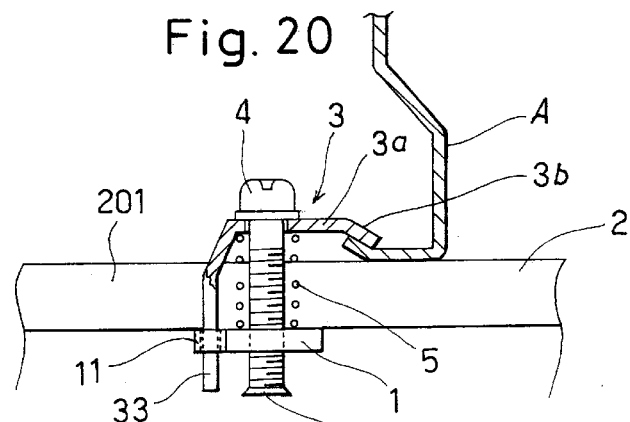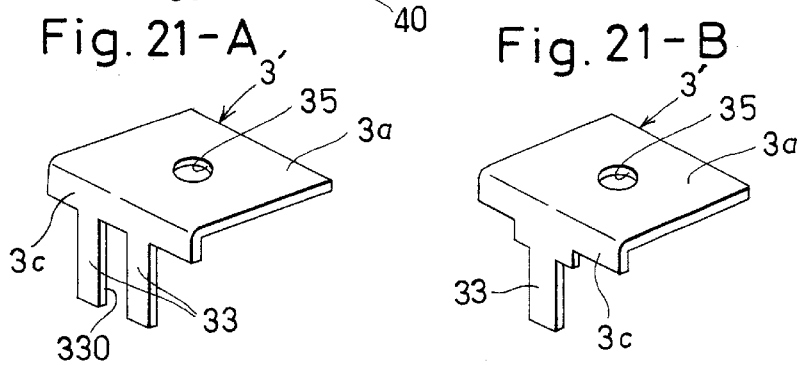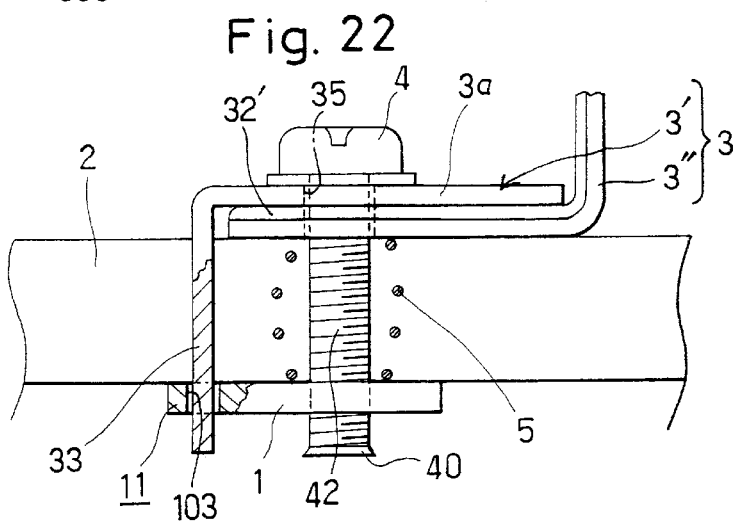

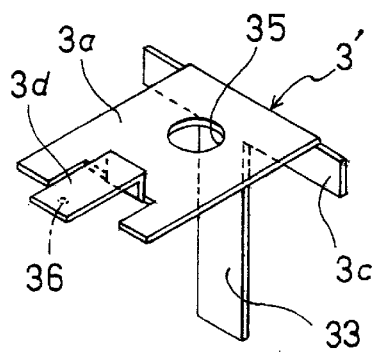
Fig. 23-A
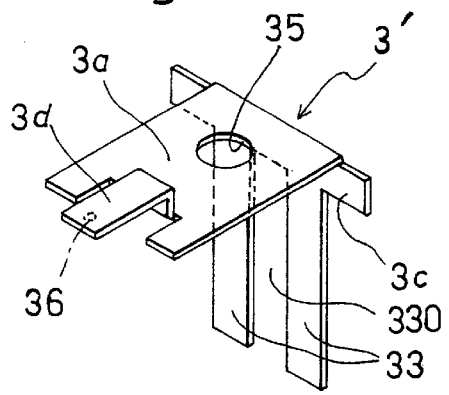
Fig. 23-B
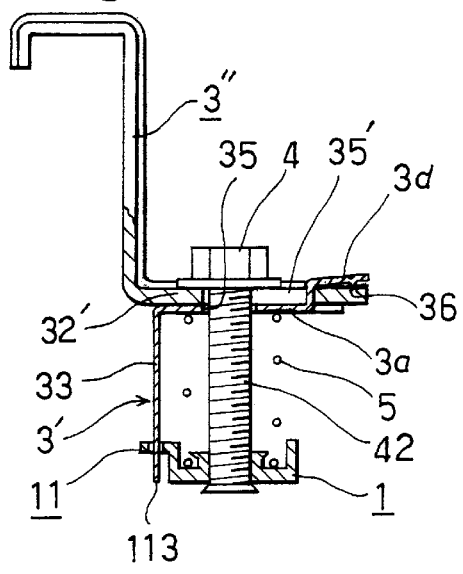
Fig. 24-A
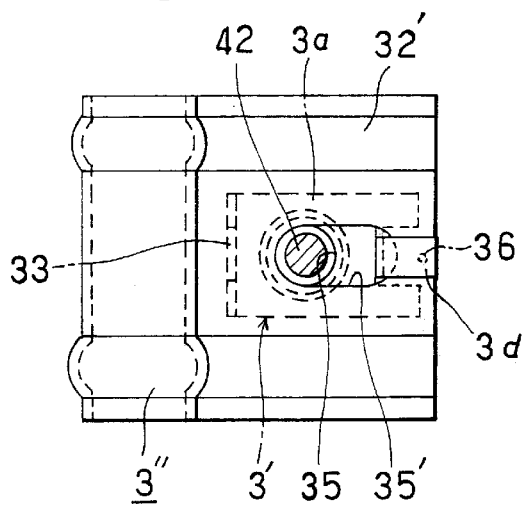
Fig. 24-B
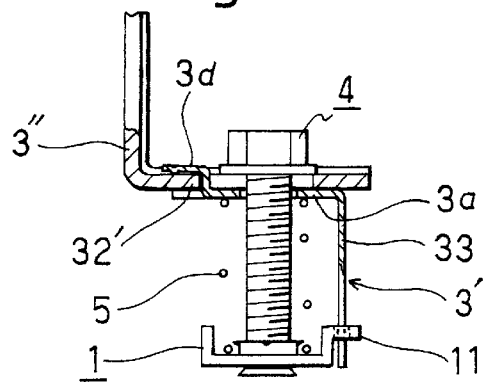
Fig. 25

Fig. 26
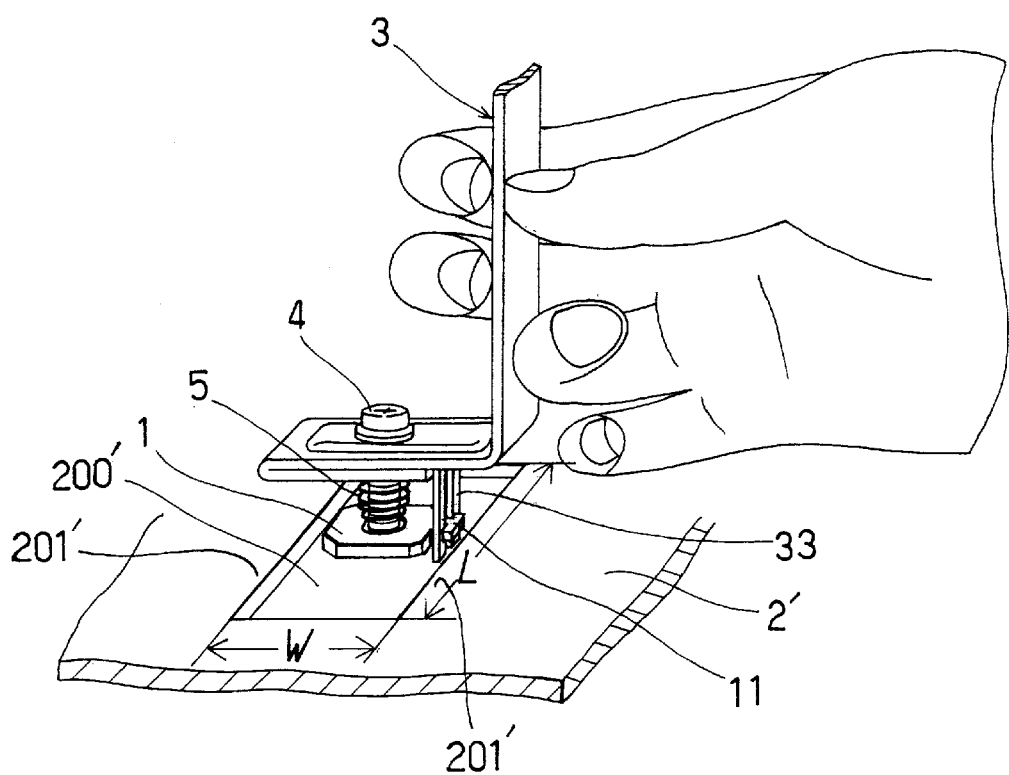
Fig. 27-A
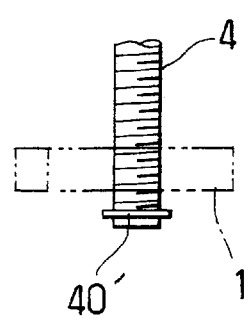
Fig. 27-B
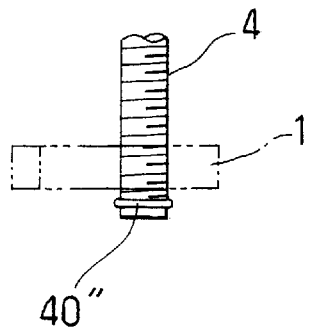

Fig. 29-A
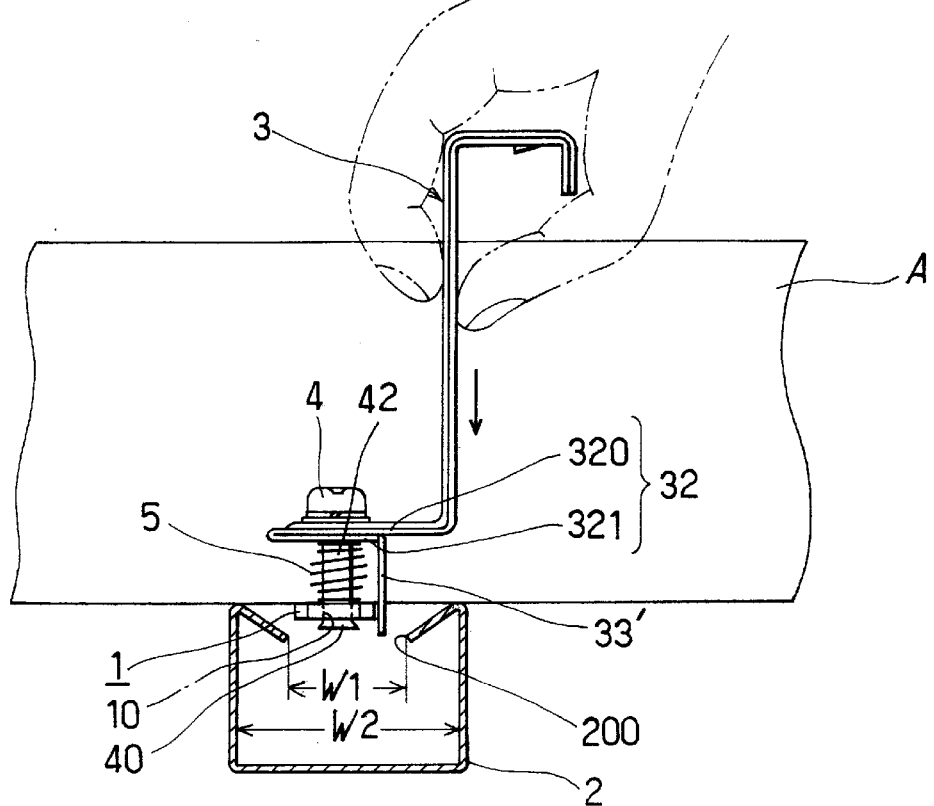
Fig. 29-B
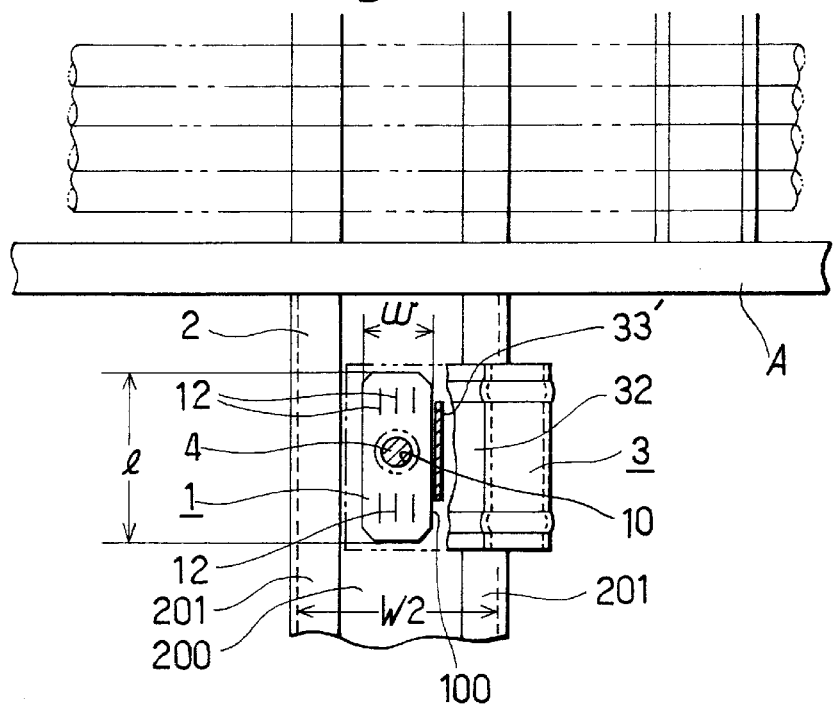

Fig. 30-A
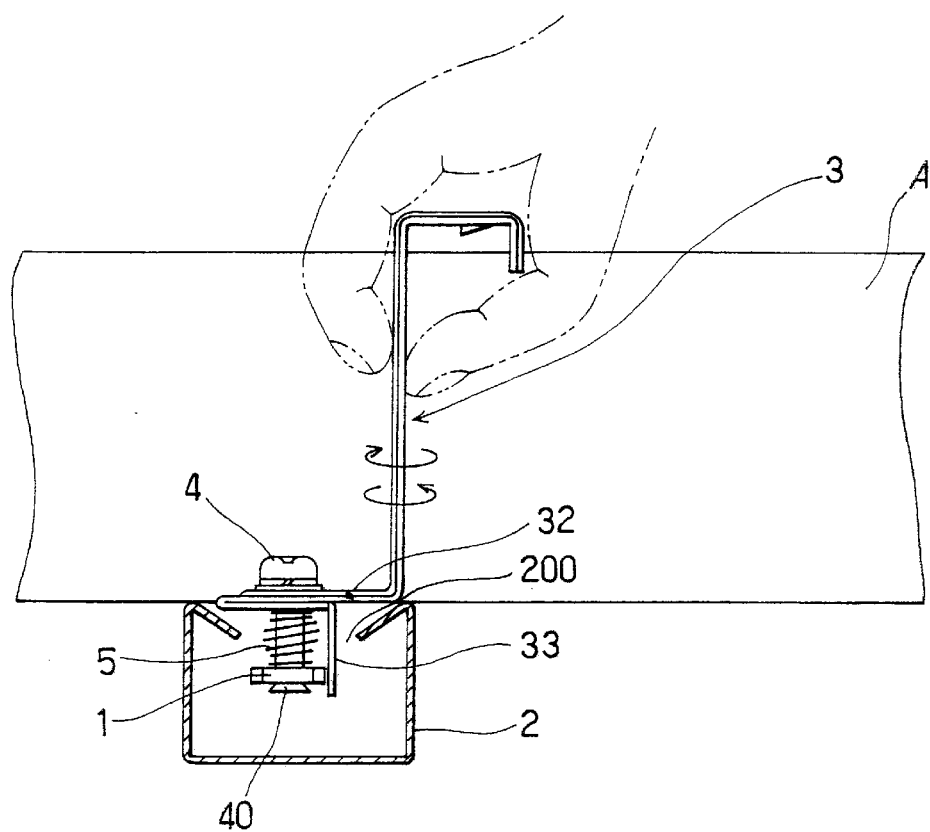
Fig. 30-B
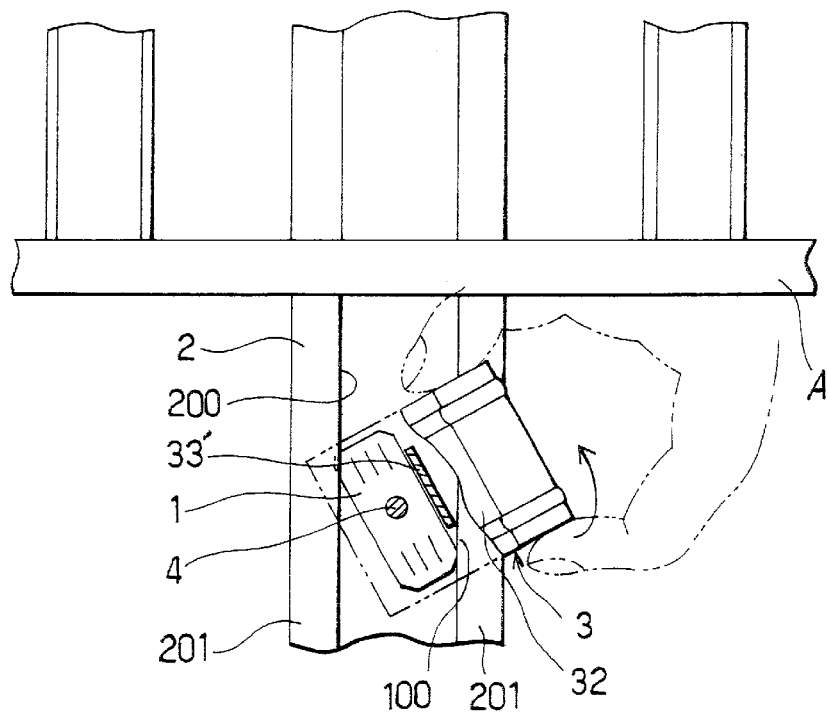

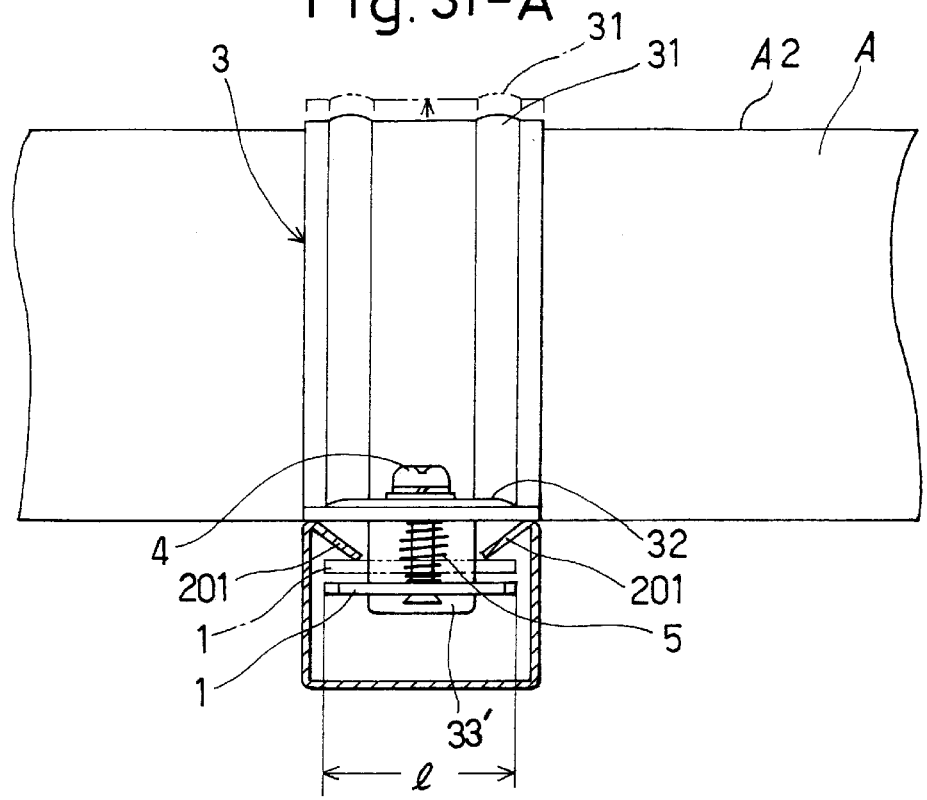
Fig. 31-A
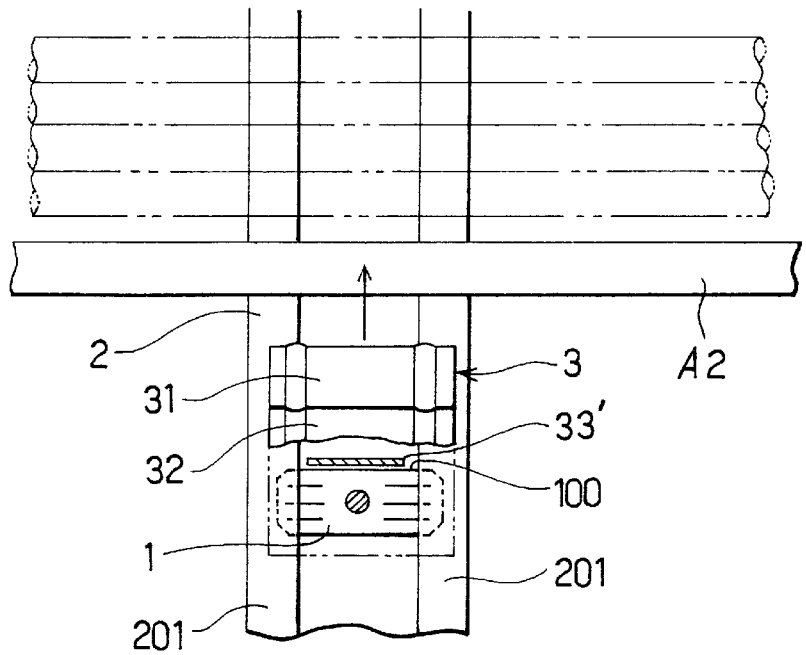
Fig. 31-B

Fig. 32-A
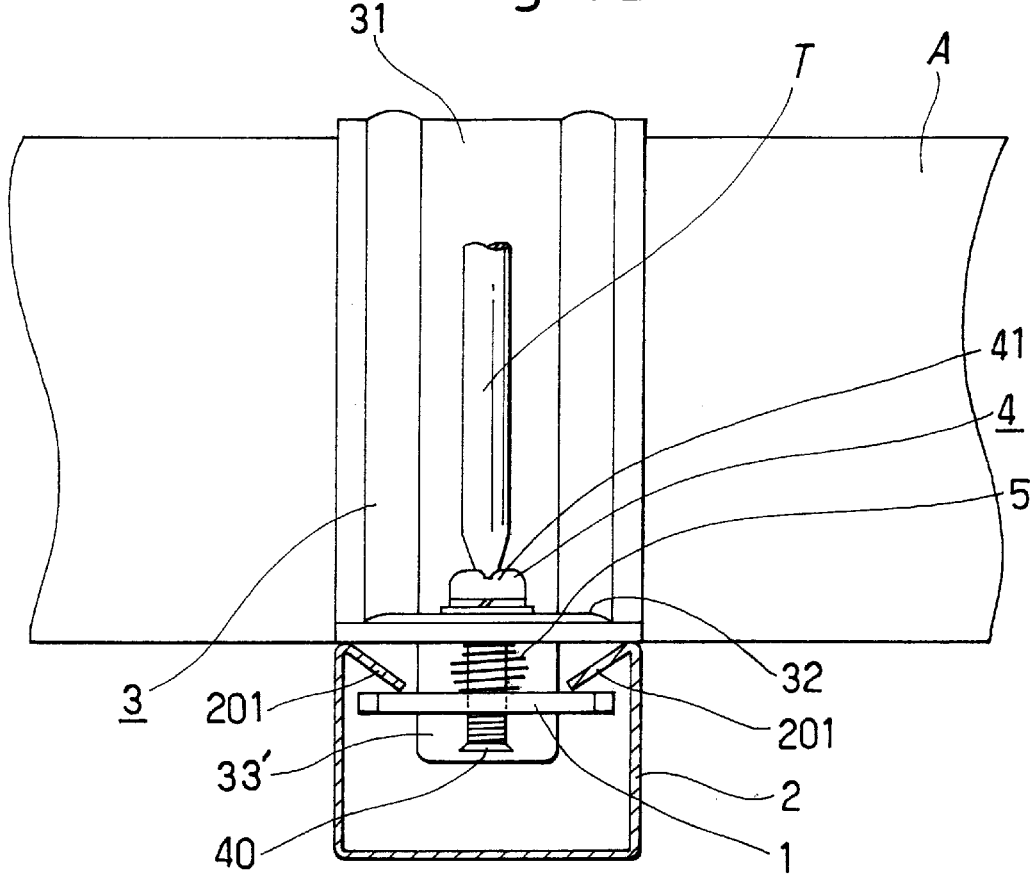
Fig. 32-B
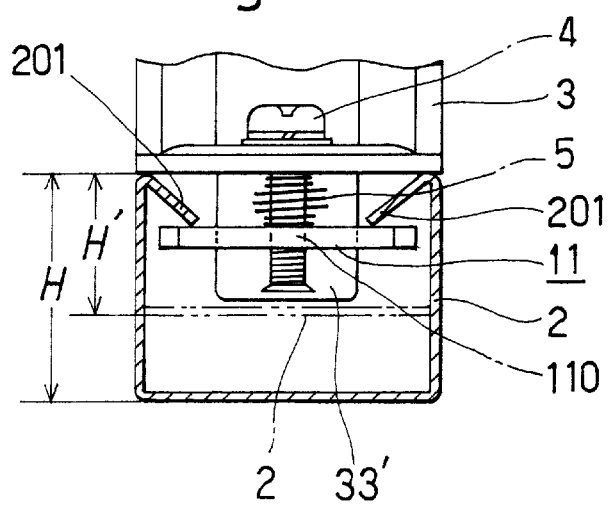

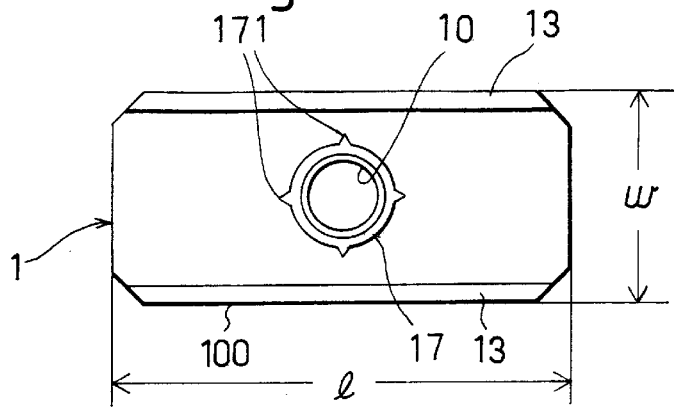
Fig. 35
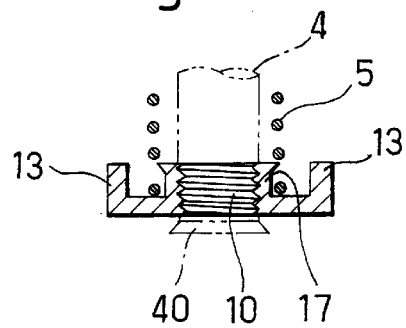
Fig. 36
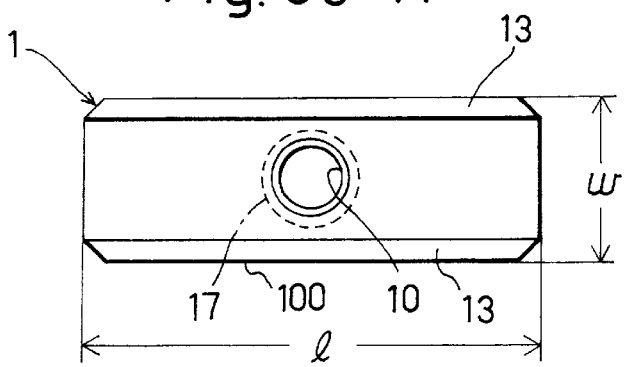
Fig. 38-A
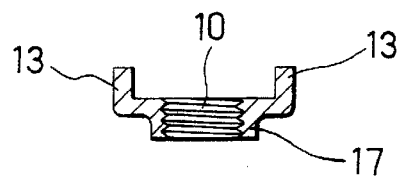
Fig. 38-B

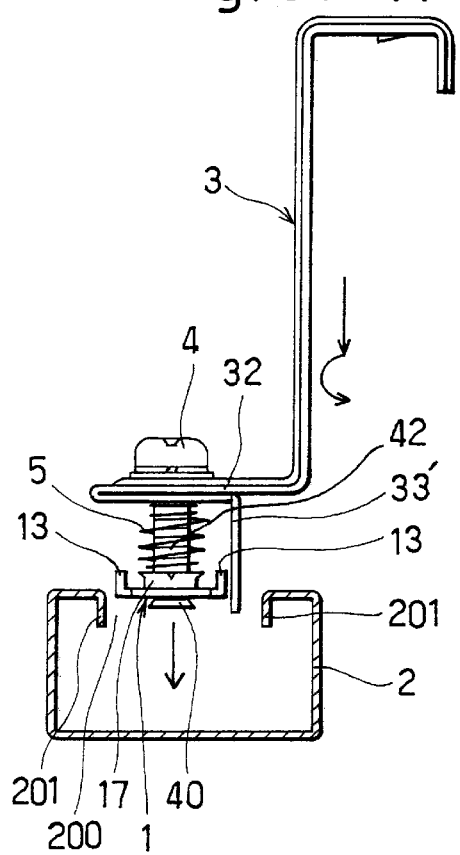
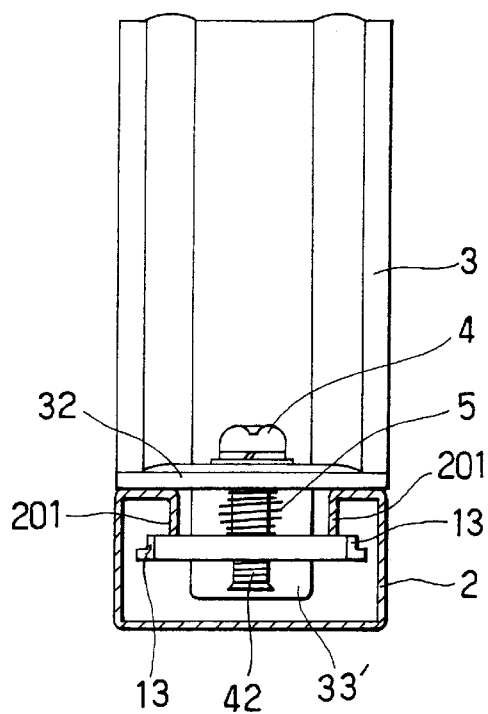
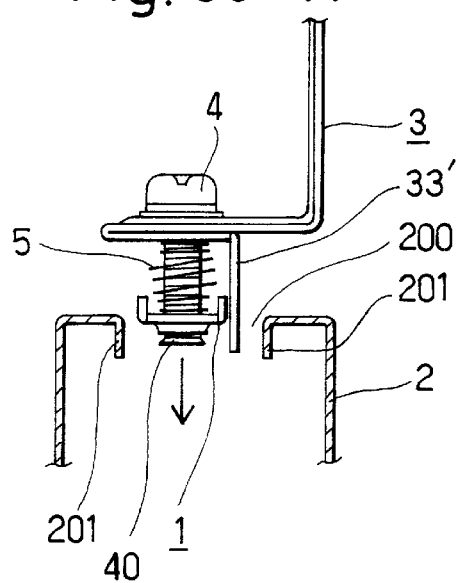
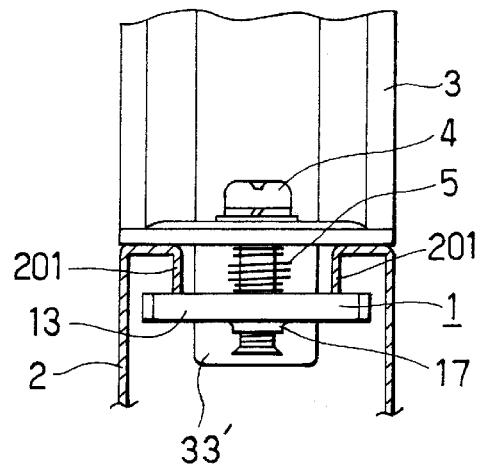

Fig.40-A
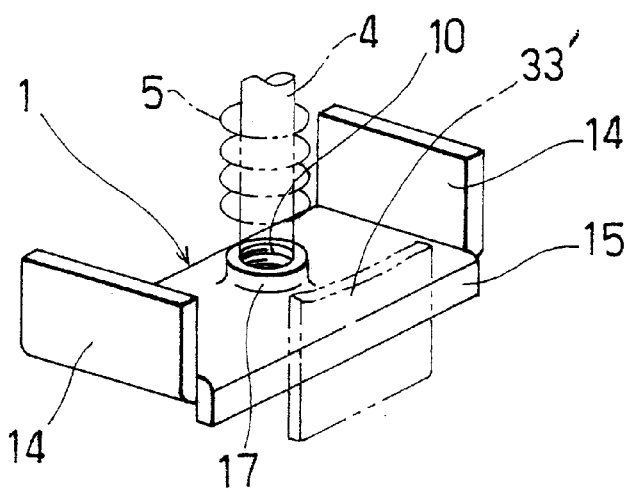
Fig.40-B
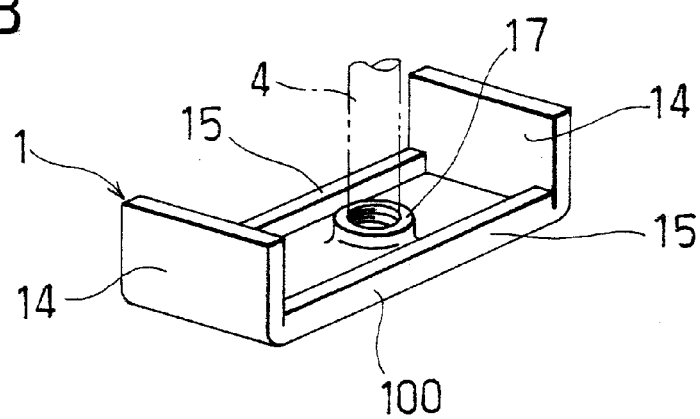
Fig.40-C
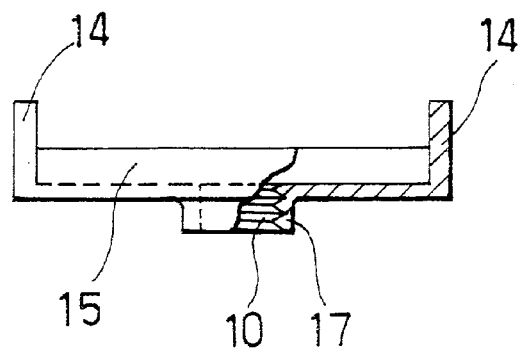

Fig. 41-A
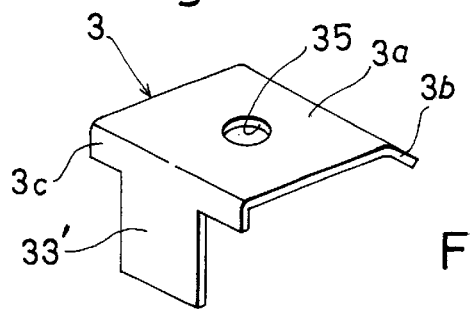
Fig. 41-B
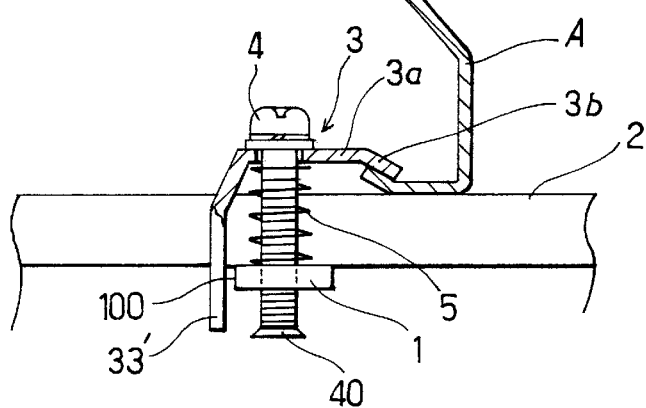
Fig. 42-A
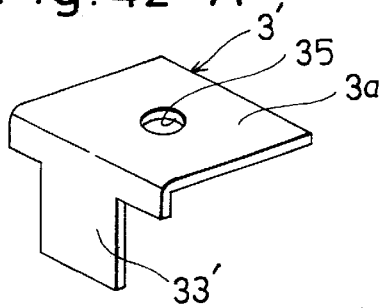
Fig. 42-B
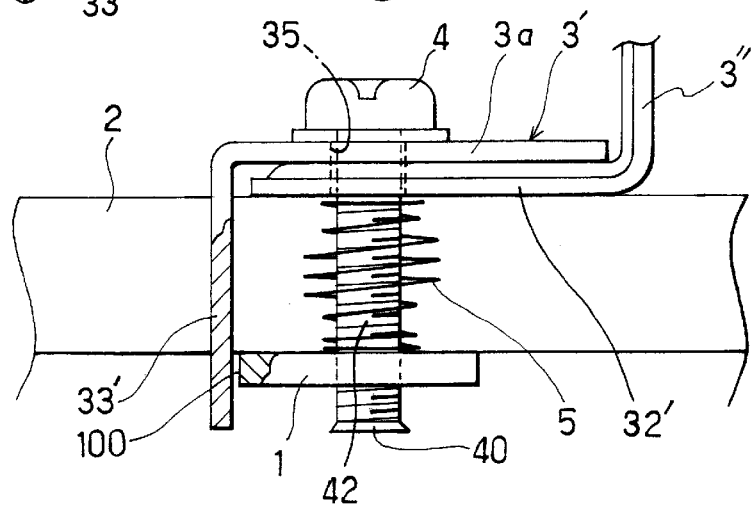

FASTENING FIXTURE

BACKGROUND OF THE INVENTION

1. Field of the Invention

The present invention relates mainly to a fastening fixture suited for fixing a cable running member on a channel rail.

2. Related Art

In the cable running work, there is indispensable a work to fix a cable running member, as represented by a beam member for forming a race way or duct, on a channel rail.

As the fastening fixture for this purpose, there have been made in the prior art a variety of proposals including the fixing of cable conduits, as disclosed in U.S. Pat. No. 4,770,378. According to this disclosure, a plate nut is screwed on a bolt having the seat for the fixture body.

However, this fastening fixture of the prior art is operationally troublesome because the plate nut has to be adjusted before use to a predetermined direction (to have its longitudinal direction in parallel with the rail channel). On the other hand, the direction of the plate nut is accidentally changed by a vibration or by contact with foreign obstacle. After the plate nut was inserted into the channel of the rail, moreover, the bolt head has to be operated each time to turn the plate nut by 90 degrees to cross the channel rail. If the bolt is then erroneously turned to a looser side, the plate nut comes out from the bolt and falls into the channel rail. As a result, working mistakes frequently occur to raise a problem that the work of this kind to fasten and fix a number of targets takes a long time to lower the efficiency.

Moreover, it is essential for the fastening fixture of the prior art to regulate the turn of the plate nut by bringing the two longitudinal ends of the plate nut into abutment against the inner flange walls of the channel rail. Therefore, the plate nut is enlarged in its size, especially in its length so that it is easily warped if subjected to the strong fastening force of the bolt. In order to prevent this warpage, it is necessary to increase the thickness of the plate nut. As a result, there arises a problem that the entire fastening fixture is large-sized and heavy so that it is difficult to handle when transported or worked.

Because of the type in which the two longitudinal ends of the plate nut are brought into abutment against the inner flange walls of the channel rail, on the other hand, the plate nut cannot be applied to a channel rail having a different inner width. Many kinds of plate nuts have to be unecomomically prepared for the kinds of the inner width of the channel rail. Another problem is that the plate nut cannot be used for a structure (of a hole type) which has no wall on the two inner sides other than the channel rail.

Since the turn is stopped by bringing the two longitudinal ends of the plate nut into the inner flange walls of the channel rail, moreover, serious affects are exerted on the surface characteristics of the inner flange walls of the channel rail. If the inner flange walls of the channel rail are made coarse or corrugated, more specifically, the plate nut does not cross the longitudinal direction of the rail channel at a right angle but is caught obliquely so that the screw cannot be turned or so that the plate nut lifts at the oblique position, as viewed in a top plan view. As a result, the plate nut is fastened without retaining a sufficient fastening area between itself and the entrance channel walls of the channel rail, so that the fastened state is liable to become unstable or unreliable to have a poor reliability in the fixing performance.

SUMMARY OF THE INVENTION

The invention has been conceived to solve the problems of the prior art and has an object to provide a fastening fixture which is enabled to fix a target temporarily and to fasten and fix the same by an remarkably simple operation, independently of the depth of the rail channel and the size of the inner flange size and which has a simple and small-sized structure and requires a small number of parts so that it can be manufactured at a low cost.

Another object of the invention is to provide a fastening fixture which can be applied not only to the channel rail but also to a holed member having no inside wall.

In order to achieve the above-specified objects of the invention, according to the invention, there is provided a fastening fixture comprising: a fixture body for fixing a target on a channel rail or a holed member; a screw having its stem portion inserted into the fixture body; and a fastening nut having an internally threaded hole to be screwed on the stem portion of the screw, wherein the fixture body includes a depending member extending in parallel with the stem portion of the screw, and wherein the fastening nut includes a guide portion to be fitted on the depending member, at the central portion of its longer side edge portion, whereby the turn of the fastening nut is regulated by the depending member and the guide portion so that it is allowed to move only in parallel with the stem portion of the screw.

Since the fastening nut is not changed in its direction relative to the fixture body by the relation between the depending member and the guide portion, according to the construction, the longer side of the fastening nut is automatically brought into parallel with the entrance channel if the fixture body is gripped by the hand and directed to cross the channel rail entrance channel or the entrance of the hole of the holed member, so that the fastening nut is inserted into the inside of the channel rail through the entrance channel or the entrance of the hole. If the fixture body is turned clockwise or counter-clockwise by 90 degrees while being gripped, the longer side of the fastening nut is oriented below the entrance walls forming the entrance channel or hole and perpendicularly of the entrance walls. By hooking the essential portion of the fixture body to bring the same into engagement or contact with the target, therefore, the temporarily fixed state can be established. If the screw is then turned, the fastening nut is lifted along the depending member while its lower side holding the relation to cross the entrance walls or hole at a right angle, and its upper face abuts strongly against the lower faces of the entrance walls so that it is firmly fastened and fixed by the fixture body. Therefore, the target can be fixed simply and promptly on the various channel rails or holed members having no side wall.

Preferably, the fastening nut has a shorter side of a width smaller than the width of the entrance channel of the channel rail and a longer side of a length larger than the width of the entrance channel but smaller than the inner width of the channel rail. Therefore, the fastening nut can be made compact, and the channel rail can be coped, now matter how large its inner width might be, with the fastening fixture of one kind.

The guide portion could take a variety of modes. In one mode, the guide portion includes a projection having a T-shape, as seen in a top plan view, and has a projection extending outward from the longer side edge portion and extensions extending to the two sides from the leading end of the projection. In this case, the depending member of the fixture body includes a longitudinal groove having a width corresponding to the projection. In another preferred mode, the guide portion has a hole. This hole has not only a closed contour but also a partial groove leading to the outside. In this case, the depending member is made of a bar to extending through the hole. Where the guide portion has the hole structure, the depending member does not come out in the least, so that it can ensure both the two turn-stopping and guiding actions.

The fastening nut is basically composed of a single part. The fastening nut is formed of not only a flat plate but also a channel-shaped section including rising walls at its longer side edge portion or its shorter side edge portion. With these rising walls, the fastening nut is enhanced in strength by the angle effect so that it can effect the strong fixing even if it is made thin.

On the other hand, an elastic member is preferably interposed between the lower face of the fixture body and the fastening nut for urging the fastening nut away from the fixture body. Before the proper fastening and fixing, according to this structure, the fastening nut can be held without shaking at a predetermined spacing from the fixture body. At the fastening and fixing time, moreover, the head of the screw does not float so that the screw can be smoothly turned. After the fastening nut was fastened, still moreover, the pushing force of the elastic member acts on the fastening nut so that the screw is not loosened even with any vibration.

Preferably, the stem portion of the screw includes a stopper portion at its lower end. This stopper portion exhibits not only the function to prevent the fastening nut from coming out but also the function to set the set position (or the lower limit) of the fastening nut in association with the elastic member.

In order to regulate the turn of the fastening nut and to allow only the parallel movement in parallel with the stem portion of the screw, according to the invention, the fixture body includes a relatively wide depending member to confront the lower side of the fastening nut. In this case, the fastening nut need not be equipped with any special guide portion so that the structure can be more simplified and small-sized to lower the cost.

The fixture body of the invention should not be limited to a single part having the depending member formed integrally with itself.

The fixture body includes a first portion having a seat portion to be seated on the channel rail, and a second portion to be combined with the first portion, and the second portion has a portion (or a body portion) to contact with the seat portion of the first portion and a depending member bent down to extend at a right angle from the leading end of the body portion.

In the invention, the name "target to be fixed" conceptionally covers the various members of various shapes and structures in the cable running work, such as beam materials, e.g., master beams or slave beams, partitions, outlet boxes or separators. On the other hand, therefore, the fixture body of the invention has various shapes and structures according to that target. In any case, however, the fixture body has a portion for engaging with, hooking, biting or jointing the target such as the essential portion (or the holding portion) for fixing the target on the channel rail or the holed member.

Although the remaining features and advantages of the invention will become apparent from the following detailed description, the invention should not be limited to the constructions exemplified by embodiments so long as the constructions are provided with the fundamental features of the invention, but could be apparently modified or corrected in various manners by those skilled in the art, without departing from the scope of the invention.

BRIEF DESCRIPTION OF THE DRAWINGS

FIG. 1 is a perspective view showing a hold-down device, to which a fastening fixture of the invention is applied, when the use thereof is started;

FIG. 2 is a perspective view of a fastening nut used in a first embodiment;

FIG. 3-A is a longitudinally sectional side elevation showing the state in which the use of the first embodiment is started;

FIG. 3-B is an enlarged side elevation of a portion of FIG. 3-A;

FIG. 3-C is a top plan view showing the first embodiment in the use starting state;

FIG. 3-D is a partially enlarged diagram of FIG. 3-C;

FIG. 4-A is a longitudinally sectional side elevation of the first embodiment which has been inserted into a channel rail;

FIG. 4-B is a top plan view showing the state in which the fixture body is changed in direction to be temporarily fixed after inserted into the channel rail;

FIG. 5-A is a longitudinally sectional side elevation showing the state in which the temporary fixing of the first embodiment is started;

FIG. 5-B is another longitudinally sectional side elevation of the same;

FIG. 5-C is a top plan view of the same;

FIG. 6-A is a longitudinally sectional side elevation showing the first embodiment in the completely fastened state;

FIG. 6-B is another longitudinally sectional side elevation of the same;

FIG. 7-A is a top plan view showing a second example of the fastening nut in the invention;

FIG. 7-B is a front elevation of the same;

FIG. 7-C is a sectional view taken along line VII—VII of FIG. 7-B;

FIG. 8-A is a longitudinally sectional side elevation showing the used state of a fastening fixture to which a second example of the fastening nut is applied;

FIG. 8-B is a longitudinally sectional side elevation of the completely fastened state of the same;

FIG. 9-A is a top plan view showing a third example of the fastening nut in the invention;

FIG. 9-B is a front elevation of the same;

FIG. 9-C is a sectional view taken along line VIII—VIII of FIG. 9-B;

FIG. 10-A is a longitudinally sectional side elevation showing the used state of a fastening fixture to which a third example of the fastening nut is applied;

FIG. 10-B is a longitudinally sectional side elevation of the completely fastened state of the same;

FIG. 11-A is a perspective view showing a fourth example of the fastening nut;

FIG. 11-B is a perspective view showing another mode of the fourth example of the fastening nut;

FIG. 11-C is a partially cut-away front elevation showing still another mode of the fourth example of the fastening nut;

FIG. 11-D is another longitudinally sectional side elevation showing the completely fastened state of a fastening fixture to which the fourth example of the fastening nut is applied;

FIG. 12-A is a top plan view showing a fifth example of the fastening nut;

FIG. 12-B is a top plan view showing another mode of the fifth example;

FIG. 13-A is a top plan view showing a sixth example of the fastening nut;

FIG. 13-B is a top plan view showing another mode of the sixth example;

FIG. 14-A is a longitudinally sectional side elevation showing the used state of the fifth example;

FIG. 14-B is another longitudinally sectional side elevation showing the completely fastened state of the same;

FIG. 15-A is a top plan view showing a seventh example of the fastening nut;

FIG. 15-B is a longitudinally sectional side elevation showing the used state of the seventh example;

FIG. 15-C is a top plan view showing another mode of the seventh example;

FIG. 15-D is a sectional view showing the used state of another mode of the seventh example;

FIG. 15-E is a top plan view showing a portion of a raw material of the fastening nut of the seventh example;

FIG. 16 is a perspective view of a fastening fixture to which FIG. 15-A is applied;

FIG. 17-A is a longitudinally sectional side elevation showing the used state of the fastening fixture to which the seventh example is applied;

FIG. 17-B is a longitudinally sectional side elevation showing the completely fastened state of the same;

FIG. 18-A is a perspective view showing an eighth example of the fastening nut;

FIG. 18-B is a perspective view showing another mode of the eighth example;

FIG. 18-C is a partially cut-away front elevation showing still another mode of the eighth example;

FIG. 19-A is a perspective view showing another example of the fixture body in the invention;

FIG. 19-B is a perspective view showing another example of the fixture body in the invention;

FIG. 20 is a partial side elevation showing the completely fastened state of the used example of the fixture body of FIG. 19-B;

FIG. 21-A is a perspective view showing an example of a second member of the fixture body in the invention;

FIG. 21-B is a perspective view showing another example of the second member of the fixture body in the invention;

FIG. 22 is a partial sectional view showing the completely fastened state of a used example of the fixture body of FIG. 21-B;

FIG. 23-A is a perspective view showing another example of the second member of the fixture body in the invention;

FIG. 23-B is a perspective view showing another example of the second member of the fixture body in the invention;

FIG. 24-A is a sectional view showing a first example in the used state of FIG. 23-A;

FIG. 24-B is a top plan view showing the first example in the used state of FIG. 23-A;

FIG. 25 is a sectional view showing a second example in the used state of FIG. 23-A;

FIG. 26 is a perspective view showing an example in which the fastening fixture of the invention is used for a holed member;

FIG. 27-A is a side elevation showing another example of a screw stopping portion in the invention;

FIG. 27-B is a side elevation showing another example of the stopping portion;

FIG. 29-A is a longitudinally sectional side elevation showing the state in which the use of the second embodiment is started;

FIG. 29-B is a cut-away top plan view of the same;

FIG. 30-A is a longitudinally sectional side elevation showing the state in which the second embodiment is inserted into the channel rail;

FIG. 30-B is a top plan view showing the state in which the same is changed in direction after inserted into the channel rail;

FIG. 31-A is a longitudinally sectional side elevation showing the temporary fixing starting state in the second embodiment;

FIG. 31-B is a top plan view of the same;

FIG. 32-A is a longitudinally sectional side elevation showing the completely fastened state in the second embodiment;

FIG. 32-B is another longitudinally sectional side elevation of the same;

FIG. 35 is a top plan view showing another mode of the fastening nut of the second embodiment;

FIG. 36 is a sectional view of the same;

FIG. 37-A is a longitudinally sectional side elevation showing the used state of the fastening fixture to which the fastening nut of FIG. 35-A is applied;

FIG. 37-B is a longitudinally sectional side elevation of the completely fastened state of the same;

FIG. 38-A is a top plan view showing another mode of the fastening nut of the second embodiment;

FIG. 38-B is a sectional view of the same;

FIG. 39-A is a front elevation showing the used state of the fastening fixture to which the fastening nut of FIG. 38-A is applied;

FIG. 39-B is a longitudinally sectional side elevation of the completely fastened state of the same;

FIG. 40-A is a perspective view showing another mode of the fastening nut of the second embodiment;

FIG. 40-B is a perspective view showing still another mode of the fastening nut of the second embodiment;

FIG. 40-C is a partially cut-away front elevation showing still another mode of the fastening nut of the second embodiment;

FIG. 41-A is a perspective view showing another example of the fixture body to be used in the second embodiment;

FIG. 41-B is a partial side elevation showing the case in which the fixture body of FIG. 41-A is used;

FIG. 42-A is a perspective view showing still another example of the fixture body to be used in the second embodiment;

FIG. 42-B is a partial side elevation showing the case in which the fixture body of FIG. 42-A is used.

DESCRIPTION OF THE PREFERRED EMBODIMENTS

Figure 28:
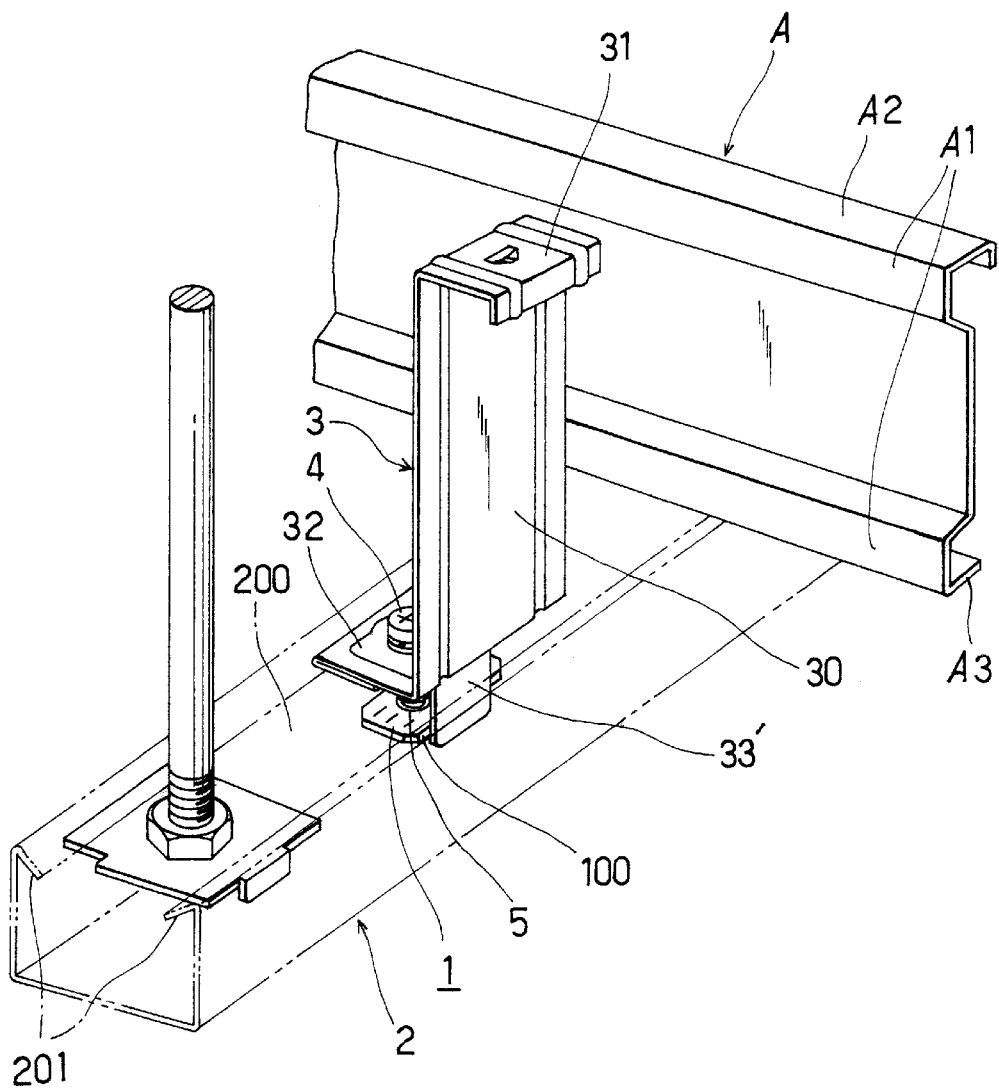
FIG. 28 is a perspective view showing the state in which the use of a second embodiment of the fastening fixture according to the invention is started.

The invention will be described in connection with its embodiments with reference to the accompanying drawings.

[First Embodiment]

FIGS. 1 to 6-B show a first embodiment of the fastening fixture of the invention. This first embodiment is exemplified by a hold-down device for holding down a duct (or a beam member) A arranged to cross over a channel rail 2.

Only one channel rail 2 is shown in the drawing, but a number of channel rails are arranged in parallel at a predetermined pitch and are suspended from the ceiling by suspenders. The channel rail 2 is constructed, as shown in FIG. 1 and FIG. 3-A, to include: a bottom wall 203; side walls 202 and 202 rising from the two widthwise ends of the bottom wall 203; and a pair of entrance walls 201 and 201 extending inward from the tops of the two side walls 202 and 202 to form an entrance channel 200. The entrance walls 201 and 201 are obliquely bent, in this example, from the tops of the side walls, but may be horizontally bent from the tops of the side walls 202 and 202 or may be bent horizontally from the tops of the side walls 202 and 202 and further perpendicularly from the bent ends.

The duct A to be fixed is made of an extruded material and constructed to include: backs A1; a bottom A3 formed at the lower end of the back A1 and adapted to be placed in a crossing shape on the entrance walls 201 and 201 of the channel rail 2; and a top A2 formed at the upper end of the back A1 and adapted to be held by a fixture body 3. Those bottom A3 and top A2 are bent perpendicularly of the backs A1.

The hold-down device is constructed to include the fixture body 3, a screw 4, a fastening nut 1 and an elastic member 5. The fixture body 3 is constructed to include: a rising portion 30 to contact with the backs A1 of the duct A; a hook portion 31 bent from the top of the rising portion 30 to hook the top A2 of the duct A; and a seat portion 32 bent from the lower end of the rising portion 30 in a backward direction of the hook portion 31. The seat portion 32 is a portion to be seated on the entrance walls 201 and 201 of the channel rail 2.

The seat portion 32 is constructed, as represented in FIG. 3-A, to include an upper plate portion 320 and a lower plate portion 321 turned and bent from the leading end of the upper plate portion 320 and laid over the upper plate portion 320. In these upper and lower plate portions 320 and 321, there are formed holes for receiving the stem portion 42 of the screw 4.

The lower plate portion 321 is provided, in front of the root end (from which the rising portion 30 starts) of the seat portion 32, with a depending member 33 extending in parallel from the stem portion 42 of the screw 4. The depending member 33 is formed into a band shape to have a lower end (or a free end) extending to a level equal to or slightly more than the leading end of the stem portion 42 of the screw 4.

The fastening nut 1 is usually made of a ferrous or non-ferrous metal and is formed into such a rectangular or similar shape in a top plan view as to have a shorter side and a longer side. This fastening nut 1 has a width (i.e., the size of the shorter side) w smaller than the width W1 of the entrance channel 200 of the channel rail 2 shown in FIG. 3-A, and a length (i.e., the size of the longer side) l longer than the width W1 of the entrance channel 200 of the channel rail 2 but shorter than the inner width W2 of the channel rail 2, i.e., the distance between the inner faces of the two sidewalls. These width w and length l are equal to those in the following individual examples.

In the central portion of the fastening nut 1, there is formed an internally threaded hole 10, into which the screw stem portion 42 is fastened after having passed through the hole of the seat portion of the fixture body 3. Slippage preventing ridges 12 are formed on the two sides of the internally threaded hole 10.

With the central portion of the longer side edge portion of the fastening nut 1, there is integrally formed a guide portion 11. This guide portion 11 provides means for integrally the fixture body 3 rotationally at all times with the fixture body 3 in association with the depending member 33 of the fixture body 3 thereby to allow the fastening nut 1 to move only vertically, i.e., in the directions parallel to the screw stem portion 42.

In this example, the guide portion 11 is formed into a projection having the shape of letter "T", as viewed in a top plan, and is constructed to include a relatively short projection 110 extending perpendicularly from the longer side edge portion, and extensions 111 extending from the leading end of the projection 110 to the two sides.

The depending member 33 of the fixture body 3 is provided, as shown in FIGS. 1 and 3-A and in FIGS. 3-B and 3-C, at its intermediate portion with a longitudinal groove 330 which is rather wider than the width of the projection 110 of the guide portion 11, and has a properly smaller thickness than the length of the projection 110. This depending member 33 need not always be split to the right and left so far to the root end.

The elastic member 5 is interposed between the seat portion 32 and the fastening nut 1 to urge the fastening nut 1 away from the seat portion. This elastic member may be made of a cylinder of rubber or plastics but is usually exemplified by a coil spring arranged around the stem portion 42 of the screw 4.

The stem portion 42 of the screw 4 is equipped at its leading end portion with a stopper portion 40 for preventing the fastening nut 1 from coming out and for setting the set position (or the lower limit) of the fastening nut 1. In this example, the stopper portion 40 is formed into a radially enlarged portion by caulking or locally bulging the lower end of the stem portion 42 of the screw 4. This stopper portion 40 is formed after the fastening nut 1 is screwed on the stem portion 42 of the screw 4.

Here will be described the using method and the actions of the first embodiment. In the normal state, the fastening nut 1 is positioned near the lower end of the stem portion 42 of the screw 4 by the stopper portion 40 and the elastic member 5. Since the projection 110 of the guide portion 11, as projecting from the longer side edge portion, is fitted in the longitudinal groove 330 of the depending member 33 depending from the seat portion 32, moreover, the longer side 100 of the fastening nut 1 is held in parallel with the seat portion 32, as shown in FIG. 3-C. This keeps the position of the fastening nut 1 unchanged even if the screw 4 is erroneously turned or if a foreign obstacle collides against the fastening nut 1.

For use, the fixture body 3 is gripped by the hand and directed so sideways, as shown in FIG. 1 and FIG. 3-A, that the widthwise direction of the seat portion 32 may intersect the entrance channel 200 of the channel rail 2. Then, the longer side 100 of the fastening nut 1 automatically comes into parallel with the entrance channel 200 so that the fastening nut 1 is inserted through the entrance channel 200 of the channel rail 2, as shown in FIG. 4-A, by lowering the fixture body 3 as it is.

Simultaneously with this, the fixture body 3 is turned clockwise or counter-clockwise by 90 degrees, as shown in FIG. 4-B, while being gripped by the hand. Then, the fastening nut 1 is not directionally changed relative to the fixture body 3 by the fitting relation between the longitudinal groove 330 of the depending member 33 and the guide portion 11. Therefore, the fastening nut 1 turns together with the fixture body 3 so that the longer side 100 of the fastening nut 1 is oriented below and perpendicularly of the entrance walls 201 and 201 forming the entrance channel 200.

FIGS. 5-A, 5-B and 5-C show the state in which the turning operation of the fixture body 3 has been finished. The fastening nut 1 is at the position of the lower limit and has a desired spacing in the height direction from the entrance walls 201 and 201. By bringing the fixture body 3 closer to the duct A to be fixed, as indicated by arrow in FIG. 5-C, and by lifting the fixture body 3, as indicated by virtual lines in FIG. 5-A, the hook portion 31 can be easily brought into engagement with the top A2 of the duct A so that the fixture body 3 can be temporarily fixed.

Moreover, the position of the duct A on the channel rail 2 is suitably adjusted, and the head 41 of the screw 4 is then turned with a tool T such as a driver. Since the guide portion 11 projecting from the longer side edge portion of the fastening nut 1 is fitted in the longitudinal groove 330 of the depending member 33, the fastening nut 1 cannot be turned but is lifted in parallel along the depending member 33 in accordance with the turns of the screw against the urging force of the elastic member 5 with the longer side 100 being held perpendicular to the entrance walls 201 and 201 composing the entrance channel 200. As a result, the fastening nut 1 is forced to contact the lower sides of the entrance walls 201 and 201 so that it is firmly fastened and fixed between the lower sides and the seat portion 32. FIGS. 6-A and 6-B show the state in which the fastening nut 1 is completely fastened and fixed. From now on, the screw is not loosened even with vibrations because the pushing force of the elastic member 5 acts on the fastening nut 1.

The invention enjoys conveniences because the screw 4 need not be operated in the least before the proper fastening time. Moreover, the fastening nut 1 is rotationally integrated with the fixture body 3 but is not turned by 90 degrees relative to the fixture body 3, and the change in the direction of the fixture body 3 leads as it is to the direction of the fastening nut 1. Therefore, no operational mistake is involved.

Moreover, the fastening nut 1 is so regulated in its independent turn by the relation to the guide portion 11 and the depending member 33, as described hereinbefore, that it can move only in the vertical directions. Therefore, the length l of the fastening nut 1 may be so small as to fall short of contact with the side walls 202 and 202 of the channel rail 2. Therefore, the fastening nut 1 selects no inner width of the channel rail 2 so that it can be applied to any channel rail 2 so long as its length l is larger than the entrance groove width W1. At the same time, the fixture body 3 may be turned either clockwise or counter-clockwise so that it can cope freely with the situations of the fixing site.

Since the fastening nut 1 has the small height, it is enabled to cope with the channel rails having various depths H and H', as shown in FIG. 6-B, by setting the stem portion 42 of the screw 4 and the depending member 33 to lengths matching the depth of the channel rail 2.

FIG. 7-A to FIG. 18-C show a variety of modes of the fastening nut 1, as suited for the invention.

FIGS. 7-A to 7-C and FIGS. 8-A and 8-B show a second example of the fastening nut 1 and a fastening fixture using it.

In this example, the fastening nut 1 is formed not into a flat shape but into a shape of channel-shaped section as a whole, in which the edge portion of its longer side 100 has a pair of rising walls 13 and 13. With this shape, the fastening nut 1 is enabled to have a higher strength by the angle effect thereby to realize a strong fastening fixture, even if it is made of a material having a relatively small thickness. The aforementioned guide portion 11 is formed on the upper end portion of one rising wall 13.

The fastening nut 1 is burred at its bottom plate portion to form a shorter cylinder portion 17, which is internally threaded, as indicated at 10. On the outer circumference of the shorter cylinder portion 17, there are formed several spring hooking projections 171 for retaining the end portion of the elastic member 5 to prevent it from coming out. In this example, the shorter cylinder portion 17 is formed upward.

The remaining constructions are similar to those of the first embodiment, and their description will be omitted, while resorting to that of the first embodiment, by designating the common portions by the common reference numerals. FIG. 8-A shows the stage at which the fixture body 3 is inserted by the hand into the channel rail 2, and FIG. 8-B shows the completely fastened and fixed state. The using method and the operations are identical to those of the first embodiment, excepting that the upper faces of the rising walls 13 and 13 abut strongly against the entrance walls 201 and 201, and their description will be omitted.

FIGS. 9-A to 9-C and FIGS. 10-A and 10-B show a third example of the fastening nut 1 and a fastening fixture using the former.

This third example is identical to the second example excepting that the shorter cylinder portion 17 having the internally threaded hole 10 is formed downward of the bottom plate portion. In these second and third examples, the screwing length with the stem portion 42 of the screw 4 is increased by the shorter cylinder portion 17, to provide an advantage that the torque for the fastening fixture can be intensified. FIG. 10-A shows the stage at which the fixture body 3 is manually inserted into the channel rail 2, and FIG. 10-B shows the completely fastened state.

FIGS. 11-A to 11-D show a fourth example of the fastening nut 1. In this example, the fastening nut 1 is provided at its shorter side edge portions with a pair of rising walls 14 and 14 and at its longer side edge portions with a pair of reinforcing walls 15 and 15, which are directed downward, as in FIG. 11-A, or upward, as in FIG. 11-B. Thus, the fastening nut 1 can thus be further reinforced by the angle effect of the bent portions of the two directions. The aforementioned guide portion 11 is formed at one reinforcing wall 15. In FIGS. 11-A and 11-B, the shorter cylinder portion 17 forming the internally threaded hole 10 is formed on the upper face side but may be formed on the lower face side, as shown in FIG. 11-C.

In this fourth example, the tops of the rising walls 14 and 14 on the shorter side abut strongly against the entrance walls 201 and 201 forming the entrance channel 200, as shown in FIG. 11-D. Therefore, this example is suitably applied to the case of the channel rail of the type in which the entrance walls 201 and 201 are bent horizontally from the tops of the side walls 202 and 202. The remaining constructions and operations are identical to those of the first embodiment, and their description will resort to that of the embodiment.

FIGS. 12-A and 12-B show a fifth example of the fastening nut 1. In FIG. 12-A, a projection 115 having a hole 113 having a slot or similar top plan shape is formed as the guide portion 11 in the longer side edge portion of the fastening nut 1. In FIG. 12-B, a groove 114 leading to the hole 113 is formed in the leading end portion of the projection 115.

FIGS. 13-A and 13-B show a sixth example of the fastening nut 1. This example is based on the same concept as that of the fifth embodiment. In FIG. 13-A, however, the fastening nut 1 is enlarged in the width w to form the hole 113 having a slot or similar top plan shape in the inner side of the longer side edge portion. In FIG. 13-B, the groove 114 leading to the longer side 100 is formed in the hole 113.

FIGS. 14-A and 14-B show a fastening fixture using the fastening nut 1 of the fifth example. The seat portion 32 of the fixture body 3 has the depending member 33 which has a sectional shape of a flat bar corresponding to the hole 113 of the guide portion 11 and which extends through the hole 113. This fastening fixture is enabled to exhibit the actions of the rotation stopper and the parallel lifting guide by the depending member 33 extending through the hole 113 of the fastening nut 1. Moreover, the depending member 33 can have the simplified structure because it may be a single, relatively narrow one.

The remaining constructions, using method and operations are identical to those of the first embodiment, and their description will resort to that of the embodiment.

FIGS. 15-A to 15-E show a seventh example of the fastening nut 1.

This seventh example is identical to the fifth one in that the projection 115 having the hole 113 is formed as the guide portion 11 in the longer side edge portion of the fastening nut 1, and that the depending member 33 extending from the fixture body 3 is extended through the hole 113. However, the fastening nut 1 is not the flat plate but has the paired rising walls 13 and 13 on the longer side edge portion, as in the second example, so that it is formed into a groove-shaped section. Moreover, the internally threaded hole 10 is burred to have the shorter cylinder portion 17.

The remaining constructions are identical to those of the second and fifth examples, and their description will be omitted by designating the corresponding portions by the common reference numerals.

When the fastening nut 1 shown in FIGS. 15-A to 15-D is to be manufactured, a rising wall forming portion 13' of a fastening nut material 1' is cut at 130 and 130 and is extended at a projection forming portion 115', as shown in an exploded state in FIG. 15-E. The fastening nut 1 is completed by bending the rising wall forming portion 13' and then by bending the projection forming portion 115' at a right angle with respect to the rising wall forming portion 13'. This manufacture method is identical to those of the foregoing second to fourth examples.

FIG. 16 and FIGS. 17-A and 17-B show a fastening fixture to which the fastening nut 1 of FIGS. 15-A and 15-B is applied. FIGS. 16 and 17-A show the state in which the fastening nut 1 is inserted into the channel rail 2, and FIG. 17-B shows the completed fastened state. The detail of the using method and the operations resorts to the description of the first embodiment.

FIGS. 18-A to 18-C show an eighth embodiment of the fastening nut 1.

This mode is identical to the foregoing fifth example in that the projection 115 having the hole 113 is formed for the guide portion 11 in the longer side edge portion of the fastening nut 1, and in that the depending member 33 depending from the fixture body 3 is extended through the hole 113. However, the differences reside in that the fastening nut 1 has the paired rising walls 14 and 14 on the shorter side edge portion, in that the paired downward or upward reinforcing walls 15 and 15 are formed at the longer side edge portion, and in that the projection 115 having the hole 113 is formed in one reinforcing wall 15.

The internally threaded hole 10 has a burred shorter cylinder portion 17, which is projected from the upper face side, as shown in FIGS. 18-A and 18-B, and from the lower face side, as shown in FIG. 18-C.

The shown modes are several ones of the invention, and no restriction should be made thereon.

1) The fastening nut 1 is generally preferred to be pressed but may be cast. The guide portion 11 may be formed integrally with the fastening nut 1 but may also be made of another member and jointed to the guide portion 11 by the welding or adhering method.

The guide portion 11 may be normally only one but may be two or more. Where the depending member 33 of the fixture body 3 is bifurcated, as shown in FIG. 1, the guide portion 11 of the fourth to eighth examples may be provided with two projections 115 having the hole 113.

2) No restriction is made on the sectional shape of the entrance walls 201 and 201 of the channel rail 2 to be fixed. The invention can be applied to all the types including the downward slope, the transverse L-shape and the horizontal shape.

3) The fixture body 3 is selected to have an arbitrary shape and structure according to the target to be fixed.

This example is shown in FIGS. 19-A and 19-B, in which the fixture body 3 is suited for the case where the target such as a beam member (or a cable tray) of an I-beam is to be fixed on the channel rail 2.

The fixture body 3 is provided at one end of its flat body portion 3a with a retaining portion 3b for the target to be fixed, to form the depending member 33 on the other side of the retaining portion 3b through an angle portion 3c. The depending member 33 of FIG. 19-A corresponds to the guide portion 11 of the fastening nut 1 of the first to fourth examples. In FIG. 19-B, the depending member 33 has a shape corresponding to the guide portion 11 of the fastening nut 1 of the fifth to eighth examples. Here, a screw hole 35 of the body portion 3a may be made circular or elongated.

FIG. 20 shows the used state of the fixture body 3 of FIGS. 19-A and 19-B. The assembly is made by inserting the guide portion 11 of the fastening nut 1 into the depending member 33 of the fixture body 3. In this state, the fixture body 3 is gripped with the longer sides of the fastening nut 1 being in parallel with the entrance channel 200, and is inserted together with the fastening nut 1 into the entrance channel 200. Then, the fixture body 3 is turned to bring the fastening nut 1 into perpendicular relation to the entrance channel 200 to lay the retaining portion 3b over a predetermined portion of a beam member A'. After this positioning, the screw 4 may be fastened.

4) The invention should not be limited to the case in which the fixture body is made of a single structure and in which the depending member is formed on the single fixture body. In other words, the fixture body may be composed in combination of a first portion having not the depending member but only the seat portion, and a second portion having the depending member. In this case, the second portion functions as an attachment or a sub-fixture body. The advantage of this mode is that the object of the invention can be achieved by making effective use of the existing fixture body as the first portion.

FIGS. 21-A and 21-B show this first example. Designated by numeral 3' is the second portion which is equipped with the depending member at one end of the flat body portion 3a through the angle portion 3c. FIG. 22 shows a using example of the first example. The body portion 3a of the second portion 3' is laid over a seat portion 32' of a first portion 3" having no depending member. The stem portion 42 of the screw 4 is inserted into the screw holes 35 and 35 which are individually formed in the body portion 3a and the seat portion 32'. The elastic member 5 is interposed between the seat portion 32' and the fastening nut 1. The using method is similar to that which has been described in connection with the first embodiment or the like. The fastening nut 1 may have any of the structures of the first to eighth examples.

FIGS. 23-A and 23-B show a second example. The second portion 3' is made to have a width smaller than that of the seat portion 32' of the first portion 3" or preferably that of the entrance channel of the channel rail. Moreover, the second portion 3' is equipped as in the first example with the depending member 33 at one end of the flat main portion 3a through the angle portion 3c, but at the other end with a clip member 3d which leads at its root end to the body portion 3a. This clip member 3d has a rising portion corresponding to the thickness of the seat portion 32' of the first portion 3" and extends horizontally from the rising portion. The clip member 3d is equipped on its lower face with a projection 36 which can be retained on the seat portion 32' of the first portion 3".

FIGS. 24-A and 24-B show a using example of the second example. In the seat portion 32' of the first portion 3", there is formed a screw hole 35' of a slot shape. The body portion 3a of the second portion 3' is applied to the lower face of the seat portion 32' to protrude the clip member 3d through the slot-shaped screw hole 35', and the body portion 3a is then slid. As a result, the seat portion 32' can be vertically clamped between the clip member 3d and a portion of the body portion to integrate the second portion 3' with the first portion 311. Therefore, the assembly is simplified.

The advantage of this second example is that the depending member 33 can be freely arranged at the position on the root end side or the free end side of the seat portion of the fixture body. This example is shown in FIG. 25, in which the depending member 33 can be disposed on the front side by reversing the second portion 3' to protrude the clip member 3d into the slot-shaped screw hole 35' and to slide the same. This second example can also be applied to a second embodiment of the invention, as will be described hereinafter.

5) The stopper portion is formed on the stem portion itself of the screw 4, as described hereinbefore, but may also be formed by fitting an E-ring 40', as shown in FIG. 27-A, or by burying the thread of the screw stem with a synthetic resin 40", as shown in FIG. 27-B.

6) In addition, the fastening fixture of the invention can be applied not only to the cable running work but also to the case in which a fixture body such as a desired target to be fixed such as an angle or stay is fixed on a plate- or box-shaped member 2', as exemplified in FIG. 26. In this case, the member 2' has to be provided with a hole 200', which need not always be elongated but may be made elliptical to have a longer diameter and a shorter diameter. The hole 200' and the fastening nut 1 are so related that the width w of the fixture body 3 is smaller than the width (of the shorter side) of the hole 200' and that the length l of the fastening nut 1 is smaller than the longer side L of the hole 200' but properly longer than the width W of the hole 200'.

The fixture body 3 is gripped to insert the depending member 33 and the fastening nut 1 into the hole 200', and is turned by 90 degrees. Then, the fastening nut 1 is automatically turned from the position of FIG. 26 to the position at which the longer side of the fastening nut 1 is perpendicular to the shorter side of the hole 200', so that it is temporarily fixed because l>W. If the screw 4 is turned, the fastening nut 1 lifts in parallel by using the depending member 33 as the guide so that it is firmly fastened and fixed on entrance walls 201' and 201' of the two sides of the hole 200'. Without any wall in the hole 200', therefore, the fixture body 3 can be firmly fastened and fixed on the lower face of the hole of the member 2'.

7) It is quite natural that the invention can be applied to the case in which the target is fixed where the entrance channel 200 of the channel rail 2 or the hole 200' of the member 2' is directed downward.

[Second Embodiment]

FIGS. 28 to 43 show a second embodiment of the fastening fixture according to the invention.

The fastening fixture of this second embodiment is also constructed to include: the fixture body 3 having a guiding depending member 33' at the seat portion 32; the screw 4 having the stem portion 42 inserted through the seat portion 32; the fastening nut 1 to be screwed on the stem portion 42; and the elastic member 5 interposed between the seat portion 32 and the fastening nut 1. However, the fastening fixture is characterized in that the fastening nut 1 has the longer side 100 to act by itself as the guide portion. Since the structure of the fastening nut 1 is simplified, the fastening fixture of the second embodiment can be manufactured at a lower cost. Since the fastening nut 1 can be made narrower than that of the first embodiment, moreover, the fastening fixture can be made compact.

The fastening nut 1 is constructed, as shown in FIGS. 29-A and 29-B, to have a shorter side of a width w smaller than the width W1 of the entrance channel 200 of the channel rail 2 and a longer side of a length l larger than the width W1 of the entrance channel 200 of the channel rail 2 but smaller than the inner width W2 of the channel rail 2. At the central portion of the fastening nut 1, there is formed the internally threaded hole 10, into which the screw stem portion 42 inserted into the hole of the fixture body 3 is fastened. However, the fastening nut 1 is not provided at its longer side with the special guide portion which is provided at the fastening nut 1 of the first embodiment.

In this embodiment, too, the target to be fixed is the duct which is arranged to cross over the channel rail 2. Therefore, the fixture body 3 is the hold-down device for fixing the duct A on the channel rail 2. These duct A and channel rail 2 are identical to those which have been described in connection with the first embodiment.

The fixture body 3 is provided is the seat portion 32 which is bent from the lower end of the rising portion 30 backward of the hook portion 31. The seat portion 32 is equipped, as shown in FIG. 26-A, with the upper plate portion 320 and the lower plate portion 321 which is turned bent from the leading end of the upper plate portion 320 and laid over the upper plate portion 320. In these upper and lower plate portions 320 and 321, there are formed the holes for receiving the stem portion of the screw 4. Moreover, the lower plate portion 321 is equipped with the depending member 33' which is extended downward from this side position of the root end of the seat portion 32.

As shown in FIGS. 29-A and 29-B, the depending member 33' is extended so that it may confront the longer side 100 of the fastening nut 1 to regulate the horizontal turn of the fastening nut 1 while allowing the movement of the same only in parallel with the screw stem portion 42. Therefore, the depending member 33' has a relatively large width, i.e., a width larger than at least the diameter of the screw stem portion 42. However, the depending member 33' need not always be made of a single band plate but may be bifurcated as in the first embodiment.

Here will be described the using method and the actions of the second embodiment. The fastening nut 1 is positioned near the lower end of the stem portion 42 of the screw 4 by the stopper portion 40 and is urged away from the seat portion by the elastic member 5. Since the longer side 100 of the fastening nut 1 confronts the depending member 33' depending from the seat portion 32, moreover, the fastening nut 1 does not change its position in the least even if the screw 4 should be turned or if another object collides against the fastening nut 1.

For use, the fixture body 3 is gripped by the hand and directed so sideways, as shown in FIG. 29-A, that the seat portion 32 may be directed to intersect the entrance channel 200 of the channel rail 2. Then, the longer side 100 of the fastening nut 1 automatically comes into parallel with the entrance channel 200 so that the fastening nut 1 is inserted through the entrance channel 200 of the channel rail 2, as shown in FIG. 30-A, by lowering the fixture body 3 as it is.

Simultaneously with this, the fixture body 3 is turned clockwise or counter-clockwise by 90 degrees, as shown in FIGS. 30-A and 30-B, while being gripped by the hand. Then, the fastening nut 1 is not directionally changed relative to the fixture body 3 by the relation between the depending member 33' and the lower side 100. Therefore, the fastening nut 1 turns together with the fixture body 3 so that the longer side 100 of the fastening nut 1 is oriented below and perpendicularly of the entrance walls 201 and 201 forming the entrance channel 200. FIGS. 31-A and 31-B show the state in which the turning operation of the fixture body 3 has been finished. The fastening nut 1 has a desired spacing from the entrance walls 201 and 201 so that the fixture body 3 can be freely changed in its height level. By lifting the fixture body 3 while bringing it closer to the duct A, as shown in FIGS. 31-A and 31-B, the hook portion 31 can be brought into engagement with the top A2 of the ladder-shaped duct A to establish the temporarily fixed state.

Moreover, the position of the duct A is suitably adjusted, and the head 41 of the screw 4 is turned with the tool T such as a driver. Since the longer side 100 confronts the depending member 33' depending from the seat portion 32, therefore, the fastening nut 1 cannot be turned but moves in parallel along the depending member 33' against the urging force of the elastic member 5 with the longer side 100 being held perpendicular to the entrance walls 201 and 201 composing the entrance channel 200. As shown in FIGS. 32-A and 32-B, the fastening nut 1 is forced to contact the lower sides of the entrance walls 201 and 201 so that it is firmly fastened and fixed between the lower sides and the seat portion 32. After fastened, the screw is not loosened even with vibrations because the pushing force of the elastic member 5 acts on the fastening nut 1.

The invention enjoys conveniences because the screw 4 need not be operated in the least before the proper fastening time. Moreover, the fastening nut 1 is not turned by 90 degrees relative to the fixture body 3 to stop the rotation with the contact with the inner width faces of the channel rail 2 but is rotationally integrated with the fixture body 3 so that the change in the direction of the fixture body 3 leads as it is to the direction of the fastening nut 1. Therefore, no operational mistake is involved.

Moreover, the fastening nut 1 is so regulated in its independent turn by the relation between the longer side 100 and the depending member 33' depending from the seat portion 32, as described hereinbefore, that it can move only in the vertical directions. Therefore, the length l of the fastening nut 1 may be shorter than the inner width W2 of the channel rail 2 and may be so small as to fall short of contact with the side walls of the channel rail. Therefore, the fastening nut 1 selects no inner width of the channel rail 2 so that it can be applied to any channel rail 2 so long as its length l is larger than the entrance groove width W1. At the same time, the fixture body 3 may be turned either clockwise or counter-clockwise so that it can cope freely with the situations of the fixing site. On the other hand, the fastening nut 1 is enabled to cope with the channel rails having various depths H and H', as shown in FIG. 32-B, by setting the stem portion 42 of the screw 4 and the depending member 33' to suitable lengths.

Figure 33:
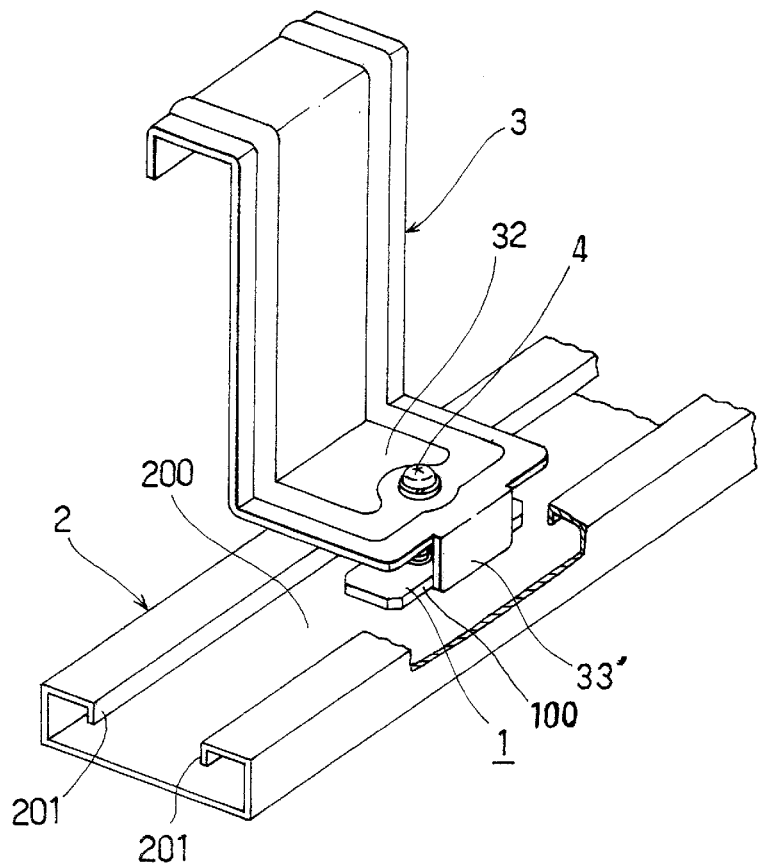
FIG. 33 is a perspective view showing another mode of the second embodiment.
Figure 34:
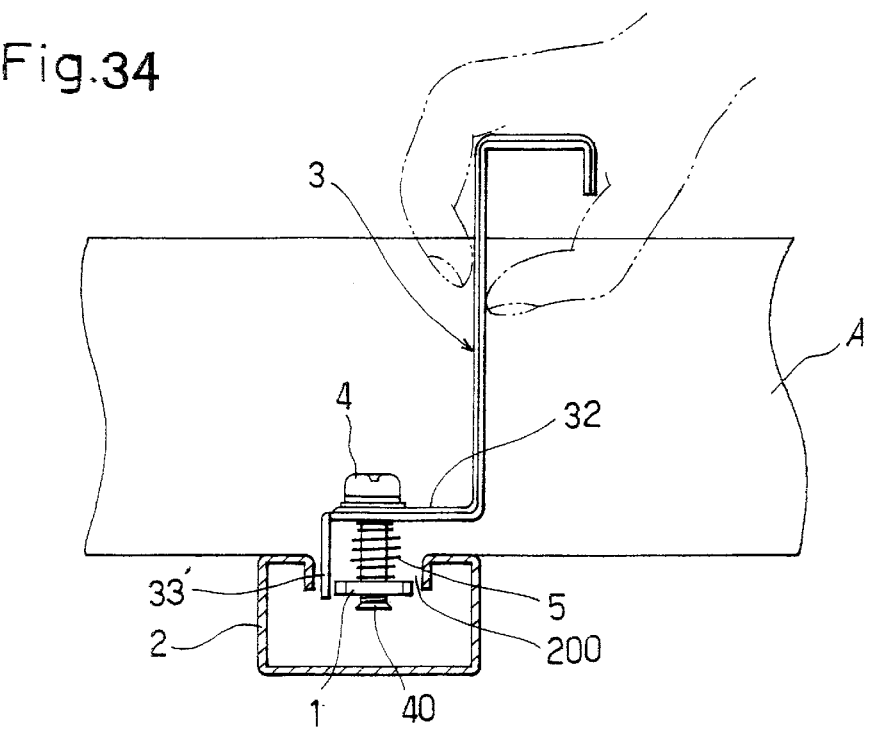
FIG. 34 is a longitudinally sectional side elevation showing the use starting state of FIG. 33.

FIGS. 33 and 34 show another example of the fixture body 3. In this example, the depending member 33' is bent from the leading end of the seat portion 32 of the fixture body 3. The remaining constructions and actions are identical to those of the aforementioned second embodiment, and their description will be omitted by designating the identical portions by the identical numerals.

FIGS. 35-A to 41-B show other modes of the fastening nut 1 to be applied to the invention. In any mode, the fastening nut 1 has a width w smaller than the width W1 of the entrance channel 200 of the channel rail 2 and a length l larger than the width W1 of the entrance channel 200 of the channel rail 2 but smaller than the inner width W2 of the channel rail 2.

In FIGS. 35 and 36 and FIGS. 38-A and 38-B, the fastening nut 1 is formed not into a flat shape but into a shape of channel-shaped section as a whole, in which the longer side 100 has the rising walls 13 and 13. The fastening nut 1 is burred at its bottom plate portion to form a shorter cylinder portion 17, which is internally threaded, as indicated at 10. On the outer circumference of the shorter cylinder portion 17, as shown in FIGS. 35-A and 36, there are formed several spring hooking projections 171 for retaining the end portion of the elastic member 5 to prevent it from coming out. In FIGS. 38-A and 38-B, the shorter cylinder portion 17 is formed downward.

The remaining constructions are similar to those of the first embodiment, and their description will be omitted, while resorting to that of the first embodiment, by designating the common portions by the common reference numerals. FIG. 37-A shows the stage at which the fixture body 3 adopting the fixture body 3 of FIGS. 35-A and 36 is inserted into the channel rail 2, and FIG. 37-B shows the completely fastened and fixed state. The using method and the actions are identical to those of the second embodiment, excepting that the rising walls 13 and 13 abut strongly against the entrance walls 201 and 201 composing the entrance channel 200, and their description will be omitted.

FIGS. 39-A and 39-B show the state at which the fastening nut 1 of FIGS. 38-A and 38-B is used and at which the fixture body 3 is manually inserted into the channel rail 2, and the completed fastened and fixed state.

FIGS. 40-A to 40-C show another mode of the fastening nut 1. In this example, the fastening nut 1 is provided on its shorter side with the rising walls 14 and 14 and on its longer side with the downward or upward reinforcing walls 15 and 15. Thus, the fastening nut 1 can thus be highly reinforced by the angle effect of the bent portions of the two directions. In FIGS. 40-A and 40-B, the shorter cylinder portion 17 forming the internally threaded hole 10 is formed on the upper face side but may be formed on the lower face side, as shown in FIG. 40-C. In these modes, the tops of the rising walls 14 and 14 abut strongly against the entrance walls 201 and 201 forming the entrance channel 200, so that the example is suitably applied to the case of the channel rail of the type in which the entrance walls 201 and 201 are bent horizontally from the tops of the rail side walls 202 and 202.

The second embodiment can adopt a variety of modes as in the first embodiment, and the description of the common contents should resort to that of the first embodiment so as to avoid its repetition.

FIGS. 41-A and 41-B show the fixture body 3 and the fastening fixture, as suited for the case where the target such as a beam member of an I-beam of bar steel is to be fixed on the channel rail, and correspond to FIGS. 19 and 20 of the first embodiment.

FIGS. 42-A and 42-B show a second portion corresponds to that of FIGS. 21 and 22 of the first embodiment. The using method is similar to that which has been described in connection with the first embodiment. The fastening nut 1 may take any of the aforementioned modes.

Figure 43:
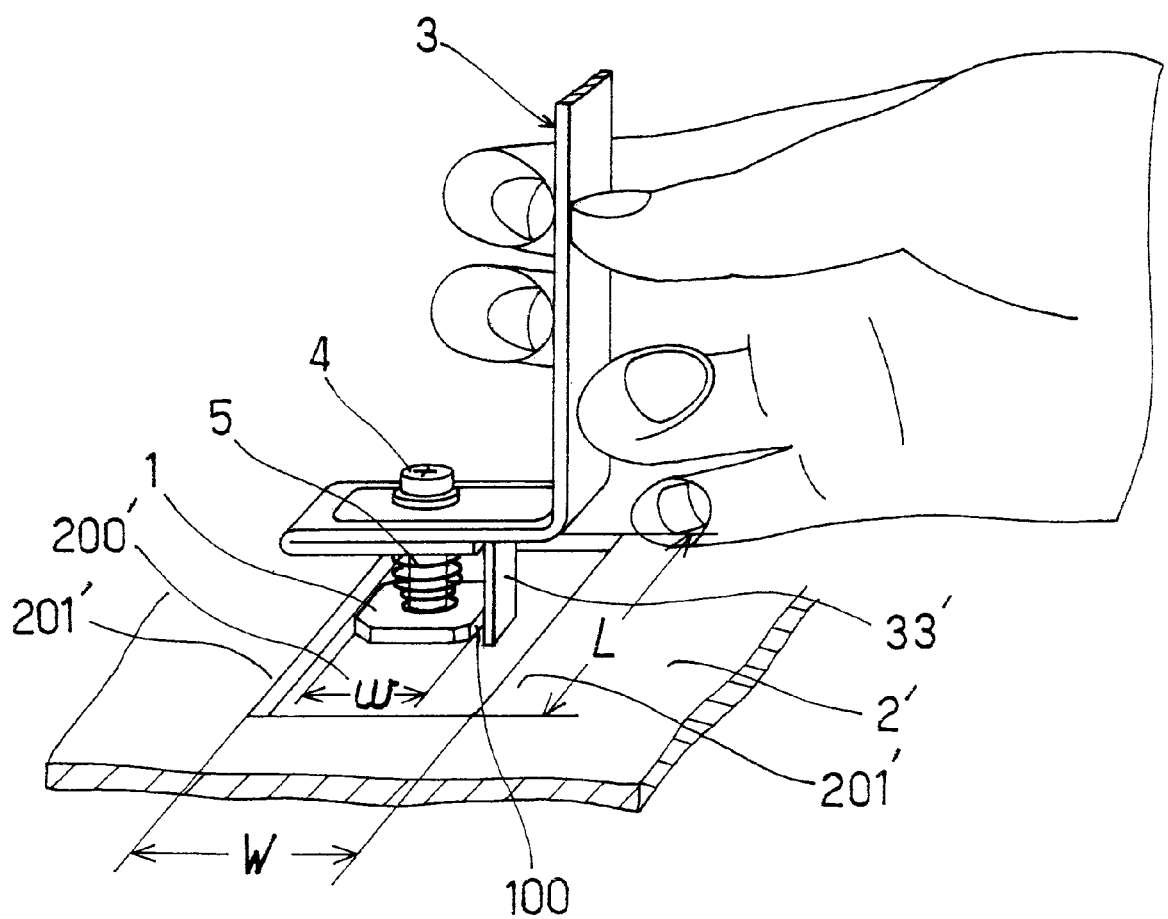
FIG. 43 is a perspective view showing an example in which the second embodiment is used for the holed member.

FIG. 43 shows an example in which the invention is applied to the member 2' having the hole 200'. The relation between the hole 200' and the fastening nut 1 is identical to that of the case of FIG. 23 of the first embodiment.

What is claimed is:

1. A fastening fixture comprising a fixture body for fixing a target on a channel rail or a holed member; a screw having a stem portion extending through said fixture body; and a fastening nut having an internal thread adapted to engage said stem portion, wherein said body has a seat portion adapted to rest on said rail and a depending member extending in parallel to said stem portion, wherein said nut is a unitary member having a rectangular shape defined by short edges and long edges, and has a guide portion formed on one of its long edges having an opening to receive said depending member, so that said nut may be restricted from turning and allowed only to move in parallel to said stem portion, so that a temporarily fixed state may be established when said fixture body is gripped to insert said nut into the channel of said rail or the hole of said holed member, and turned by 90 degrees.

2. A fastening fixture according to claim 1, wherein said guide portion opening is a hole, and wherein said depending member is made of a bar to extend through said hole.

3. A fastening fixture according to claim 1, further comprising:

an elastic member interposed between said fixture body and said fastening nut for urging said fastening nut away from said fixture body.

4. A fastening fixture comprising a fixture body for fixing a target on a channel rail or a holed member; a screw member having a stem portion extending through said body; a fastening nut having an internal thread adapted to engage said stem portion; and an elastic member interposed between said body and said nut for urging said nut away from said body, wherein said nut has short edges of a width smaller than a width of the channel of said rail or the hole of said holed member and long edges of a length larger than said width of said channel, but smaller than the inside width of said rail, and has a guide portion formed on one of its long edges having an opening, and wherein said body has a relatively wide depending member received in said opening of said guide portion confronting one of said long edges for restraining said nut from turning and allowing it only to move in parallel to said stem portion, so that a temporarily fixed state is established when said body is gripped to insert said nut into said channel or hole, and turned by 90 degrees.

5. A fastening fixture according to claim 4, wherein said fastening nut includes a pair of rising walls at its longer side portion or its short edges.

* * * * *